(12) United States Patent
Pilo et al.

(10) Patent No.: US 12,737,138 B1
(45) Date of Patent: Sep. 15, 2026

(54) MEMORY DATA INVERSION

(71) Applicant: Synopsys, Inc., Sunnyvale, CA (US)

(72) Inventors: Harold Pilo, Underhill, VT (US); Anurag Garg, Cupertino, CA (US)

(73) Assignee: Synopsys, Inc, Sunnyvale, CA (US)

( * ) Notice: Subject to any disclaimer, the term of this patent is extended or adjusted under 35 U.S.C. 154(b) by 113 days.

(21) Appl. No.: 18/678,109

(22) Filed: May 30, 2024

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
None
See application file for complete search history.

(56) References Cited

U.S. PATENT DOCUMENTS 6,999,371 B2 * 2/2006 Nii ........................ G11C 11/417 365/205
7,974,126 B2 * 7/2011 Sumitani .............. G11C 7/1006 365/189.02
8,520,447 B2 * 8/2013 Yoon .................... G11C 7/1006 365/189.011
9,047,981 B2 * 6/2015 Hegde ................... G11C 11/419
10,747,456 B2 * 8/2020 Song ...................... G11C 29/52
11,237,729 B1 * 2/2022 Dwibedy ................ G06F 3/061

OTHER PUBLICATIONS

"ASAP 1M Ultra-Low-Power Via23 ROM Compiler for TSMC 90nm G LowK Periphery Standard Vt/Cell High Vt Process User's Manual," rev. Oct. 11, 2007, Virage Logic Corporation, Fremont, California, USA.

* cited by examiner

*Primary Examiner* — Elias Mamo
(74) *Attorney, Agent, or Firm* — Davenport IP Law, PLLC

(57) ABSTRACT

An example is a circuit including a memory output block having a single bit width output node. The memory output block includes a memory bank and a logic inversion circuit. The memory bank is configured to output a read datum. The logic inversion circuit is associated with the memory bank. An input node of the logic inversion circuit is electrically coupled to the memory bank to receive the read datum. The logic inversion circuit is configured to output an output datum on an output node of the logic inversion circuit. The logic inversion circuit is configured to obtain the output datum by selecting either one of an inverted version of the read datum or a non-inverted version of the read datum received from the memory bank based on a column of the memory bank from which the read datum is read.

20 Claims, 16 Drawing Sheets

| PULL-DOWN TRANSISTOR OF MEMORY CELL | STORED NON-INVERTED DATA (FIGS. 3A AND 3B) | STORED INVERTED DATA (FIGS. 3C AND 3D) |
|---|---|---|
| 202-07 | 0 | 1 |
| 202-06 | 0 | 1 |
| 202-05 | 1 | 0 |
| 202-04 | 0 | 1 |
| 202-03 | 0 | 1 |
| 202-02 | 0 | 1 |
| 202-01 | 1 | 0 |
| 202-00 | 0 | 1 |

FIG. 3E

DINV
VDD
YS7B
YS7
232-7
236-7
234-7
YS6B
YS6
232-6
236-6
234-6
VDD
YS5B
YS5
232-5
236-5
234-5
YS4B
YS4
232-4
236-4
234-4
VDD
YS3B
YS3
232-3
236-3
234-3
VDD
YS2B
YS2
232-2
236-2
234-2
VDD
YS1B
YS1
232-1
236-1
234-1
YS0B
YS0
232-0
236-0
234-0

BL Circuit
126
120
722
Sense Amplifier
224
226
228
Q
DINV
128
746
744-v
744-0
742
732-i
732-1
732-0
736-i
734-i
736-1
734-1
736-0
734-0
VDD
YSi
YS1
YS0
102
YADDR
BLi
BL1
BL0
WLj
WL1
WL0
202-ij
202-i1
202-i0
202-1j
202-11
202-10
202-0j
202-01
202-00
214-i
214-1
214-0

MEMORY DATA INVERSION

BACKGROUND

Various memory technologies have been developed. Broadly, read-only memory (ROM) permits reading data that has been programmed, such as programmed during the manufacturing process, but commonly does not permit re-programming data to that memory after that memory has been manufactured. Some more recently developed ROM technologies permit re-programming the memory, such as electrically erasable programmable ROM (EEPROM). ROM is usually non-volatile in that ROM may retain its data when a power source is removed. Random access memory (RAM) typically permits reading and re-writing data and is usually volatile. Various memory technologies may experience disadvantages, even if those technologies are very mature.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 3E is a table summarizing the storage of data described above in FIGS. 3A through 3D.

DETAILED DESCRIPTION

Figure 1:
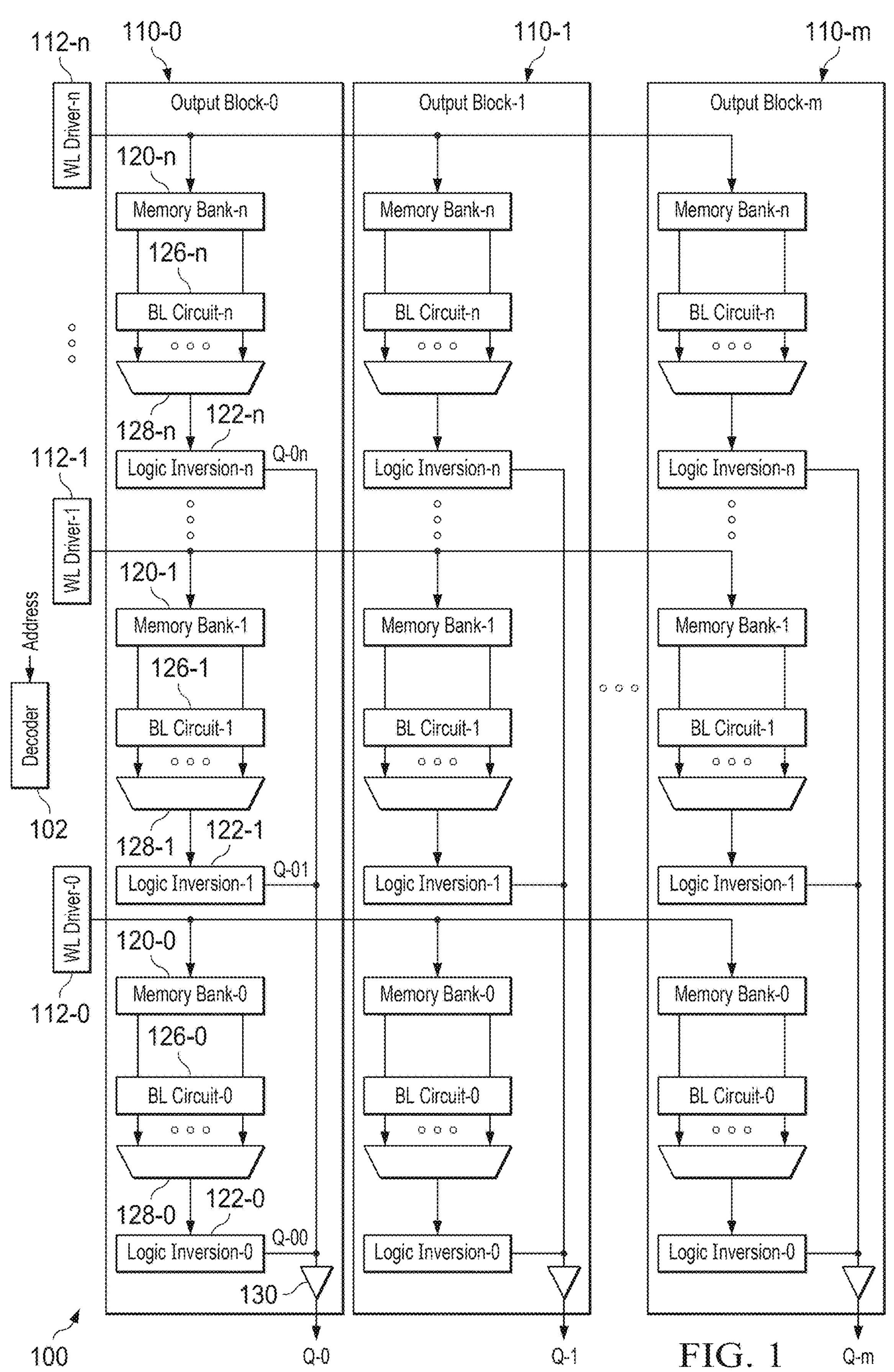
FIG. 1 is a memory architecture according to some examples.

Aspects of the present disclosure relate to memory data inversion. Some memory technologies may experience effects that favor or disfavor a particular data state (e.g., a logical state). For example, in a read-only memory (ROM) technology, a pull-down transistor may be electrically connected in a way that (i) permits the pull-down transistor to pull down a voltage of a bit line or (ii) disables the pull-down transistor from pulling down the voltage of the bit line. If the pull-down transistor is electrically connected to permit pulling down the voltage of the bit line, the memory cell (e.g., a bit cell) is programmed to be a logical "0", and when the pull-down transistor is disabled from pulling down the voltage of the bit line, the memory cell is programmed to be a logical "1". To be programmed to be a logical "0", the source/drain nodes of the pull-down transistor may be respectively electrically connected to the bit line and a grounded power supply node (e.g., a VSS or ground node). To be programmed to be a logical "1", any source/drain node (e.g., one or both) of the pull-down transistor may be electrically floating or both source/drain nodes may be electrically connected to a same node (e.g., electrically shorting the source/drain nodes. The gate node of the pull-down transistor may be electrically connected to a corresponding word line.

To read a target memory cell, the bit line is charged to a high voltage, and the word line is asserted. If the memory cell is programmed to be a logical "0", the pull-down transistor pulls the voltage of the bit line down to a low voltage due to the assertion of the word line and the connections of the source/drain nodes of the pull-down transistor. If the memory cell is programmed to be a logical "1", the pull-down transistor is disabled from pulling down the voltage of the bit line, so the bit line is to retain its high voltage. However, pull-down transistors of other memory cells electrically connected to that bit line and programmed to be respective logical "0"s may experience leakage during such a read operation. This leakage may sufficiently discharge the high voltage on the bit line such that the voltage sensed on the bit line is sufficiently low to cause a logical "0" to be erroneously read. Accordingly, such a ROM technology favors logical "1"s being programmed to the memory cells to reduce leakage and to reduce the likelihood of an erroneous logical "0" from being read.

Further, in some instances, such memory may not have redundancy. Redundancy may permit erroneously read data to be converted to correct data. However, without redundancy, the memory may have extremely low failure rate requirements.

Memory may be segmented. For example, a logical array of memory may be segmented into memory output blocks, where each memory output block has an n-bit output width (e.g., a single bit output width). The memory may further be segmented into memory banks within a memory output block. Each memory bank may include a memory array including columns and rows of memory cells (e.g., bit cells). Segmentation, such as with memory output blocks and memory banks, may permit a logical array of memory to be segmented and folded into an architecture that may be more practically implemented.

According to some examples described herein, data programmed to a column of a memory bank may be inverted to be a majority of a target logical state, such as a majority of logical "1"s. More specifically, data may be inverted on a column-by-column basis within a memory bank. Examples described herein provide for a respective logic inversion circuit associated with a memory bank. The logic inversion circuit is configured to output an output datum on an output node of the logic inversion circuit. The logic inversion circuit is configured to obtain the output datum by selecting an inverted version of a read datum or a non-inverted version of the read datum received from the associated memory bank based on a column of the memory bank from which the read datum is read.

Technical advantages of the present disclosure include, but are not limited to, reduced leakage when reading a given state of a memory cell. For example, in the ROM technology described above, inverting data to be a majority of logical "1"s may reduce leakage when reading a logical "1" since fewer memory cells are programmed with a logical "0" that may cause leakage. Further, by permitting inversion on a column-by-column basis, smaller chunks of memory cells may be independently inverted, which statistically may increase the number of logical "1"s programmed to the memory that further decreases the leakage. With reduced leakage, a logical "1" read from a memory cell may be more likely to be read correctly. Also, word line pulse widths may be wider (e.g., longer duration), which may increase an ability for a sense amplifier to read a logical "0". Similarly, a majority of logical "1"s may reduce the number of connections of memory cells to the bit line, which may in turn reduce the capacitive load of the bit line and improve the read performance when reading a logical "0" from a logical "0" programmed memory cell. Examples may implement dynamic data inversion for read operations that consume a relatively small area on an integrated circuit die. Other and/or additional advantages and benefits may be achieved in other examples.

Various modification may be made to examples described herein. Examples described herein may be described in the context of implementing various logic. Logic circuits may be modified and may implement equivalent logic circuits. Inverse logic levels may be implemented instead of and/or in addition to logic levels described herein. Examples described herein are described in the context of rows and columns. Rows and columns are used herein in the context of arrays merely to indicate relative orientation between a row and a column. In some examples, a column described herein may be considered a row, and a row described herein may be considered a column. Any methodology described herein may be performed in any logical order. Such modifications may implement a same or similar functionality and may achieve advantages and benefits described above.

A node of a circuit may be described with a reference name. The node may carry a signal and/or have a voltage thereon. The signal and/or voltage on the node may follow a same reference name. The presence of a node indicates the presence of a corresponding signal and/or voltage similarly named, and the presence of a signal and/or voltage indicates the presence of a corresponding node similarly named on which is that signal and/or voltage. For example, a bit line 0 node (BL0) has a bit line 0 voltage or signal (BL0).

Various examples described herein are described in the context of a ROM technology. More specifically, examples described herein are described in the context of selectively inverting data programmed to ROM to achieve a majority of logical "1" state on a column-by-column basis. Other examples may be implemented in the context of different memory technologies. Further, data may be selectively inverted to a majority of logical "1" state or a majority of logical "0" state depending on, for example, what the particular memory technology favors.

FIG. 1 is a memory architecture 100 according to some examples. The memory architecture 100 includes a decoder 102, (m+1) number of memory output blocks 110-0, 110-1, . . . , 110-*m* (collectively or individually, memory output block(s) 110), and (n+1) number of word line driver circuits 112-0, 112-1, . . . , 112-*n* (collectively or individually, word line driver circuit(s) 112). Each memory output block 110 includes (n+1) number of memory banks 120-0, 120-1, . . . , 120-*n* (collectively or individually, memory bank(s) 120); (n+1) number of logic inversion circuits 122-0, 122-1, 122-*n* (collectively or individually, logic inversion circuit(s) 122); (n+1) number of bit line circuits 126-0, 126-1, . . . , 126-*n* (collectively or individually, bit line circuit(s) 126); and (n+1) number of multiplexers 128-0, 128-1, . . . , 128-*n* (collectively or individually, multiplexer(s) 128). Each memory bank 120-*g* has an associated logic inversion circuit 122-*g*, bit line circuit 126-*g*, and multiplexer 128-*g*. Each word line driver 112-*g* may drive a signal on a word line electrically connected to corresponding memory banks 120-*g* in the output blocks 110.

For convenience herein, use of an appended "-g" (or similar) indicates a correspondence between or an association with the components identified with the "-g" (or similar). Similarly, use of an appended "-gh" indicates a correspondence between or an association with the components identified with the "-g" (or similar) and with the components identified with an "-h" (or similar), although no correspondence or association is to be necessarily inferred between the components identified with the "-g" (or similar) and the components identified with an "-h" (or similar).

A memory bank 120 includes memory cells (e.g., bitcells) arranged in an array (e.g., arranged in rows and columns). In some examples, the memory cells may be any memory technology. In specific examples described below, the memory cells may be ROM that are programmed using back-end-of-the-line (BEOL) metal programming. The memory cells may be programmed with data that is selectively inverted on, e.g., a column-by-column basis to be a majority of a target logical state, such as a majority of logical "1". That is, half or more of the memory cells in a column may be programmed with data to result in a majority of the target logical state, which may be inverted from an original logical state. In other examples, the memory cells may be programmed with data that is selectively inverted on, e.g., a column-by-column basis to be above or below any threshold number of a target logical state. As used herein, a datum stored in a memory cell of the memory bank 120 that is a same logical state as the original datum to be programmed is a stored non-inverted datum. Conversely, a datum stored in a memory cell of the memory bank 120 that is an inverted logical state from the original datum to be programmed is a stored inverted datum.

A logic inversion circuit 122-*g* is configured to output an output datum on an output node Q-g of the logic inversion circuit 122-*g*. The logic inversion circuit 122-*g* is configured to obtain the output datum by selecting an inverted version of a read datum or a non-inverted version of the read datum received from the associated memory bank 120-*g* based on the column of the memory bank 120-*g* from which the read datum is read. When a datum is read from a column of the memory bank 120-*g*, the logic inversion circuit 122-*g* determines whether to select the inverted or non-inverted version of the read datum based on the column from which that datum is read and correspondingly outputs the inverted version or the non-inverted version of the read datum based on the determination. When the read datum is a stored inverted datum, outputting an inverted version of the read datum returns the stored inverted datum back to the original, non-inverted datum. An original datum is inverted for storage (to be stored inverted datum), and the read datum is inverted again for output thereby inverting the stored inverted datum, which returns the datum to its original logical state.

The output nodes Q-00, Q-01, . . . . Q-0*n* of the respective logic inversion circuits 122-0, 122-1, . . . , 122-*n* are electrically connected together and to an input node of a buffer circuit 130. The output node of the buffer circuit 130 is the output node of the memory output block 110 that includes the buffer circuit 130. For example, the output node Q-0 of the memory output block 110-0 is the output node of the illustrated buffer circuit 130 in FIG. 1. In the illustrated example, the output node Q-0 (e.g., the output node of the buffer circuit 130) is a single bit width output node that may be sampled at any instance to obtain an output datum. For example, sampling the output node Q-0 once obtains a single bit datum. Sampling the output node Q-0 multiple times may obtain multiple bits of data.

The decoder 102 has address input nodes on which the decoder 102 is configured to receive an address. The decoder 102 is configured to decode the address and assert control signals that select a memory bank 120 within a memory output block 110 and a memory cell within that memory bank 120 for reading. The control signals may control the word line driver circuit 112-*g* and bit line circuit 126-*g* for reading a memory cell in the memory bank 120-*g*. For example, the control signals may cause a target word line driver circuit 112-*g* to assert the word line of the memory cell to be read and may cause the bit line circuit 126-*g* to pre-charge the bit line of the memory cell to be read. Further, as described in subsequent examples, the decoder 102 may indicate to the logic inversion circuit 122-*g* and the multiplexer 128-*g* from which column of the memory bank 120-*g* the datum is being read. The multiplexer 128-*g* is configured to selectively pass the read datum from the memory bank 120-*g* to the logic inversion circuit 122-*g* based on the indication of the column received from the decoder 102. The logic inversion circuit 122-*g* is configured to select the inverted or non-inverted version of the read datum received from the multiplexer 128-*g* based on indication of the column received from the decoder 102.

In FIG. 1, the architecture of the memory output block 110-0 is illustrated (e.g., including, among other things, memory banks 120-0 through 120-*n* and logic inversion circuits 122-0 through 122-*n*). The architecture of the memory output block 110-0 is replicated in other respective memory output block 110, although not specifically illustrated in FIG. 1.

Figure 2:
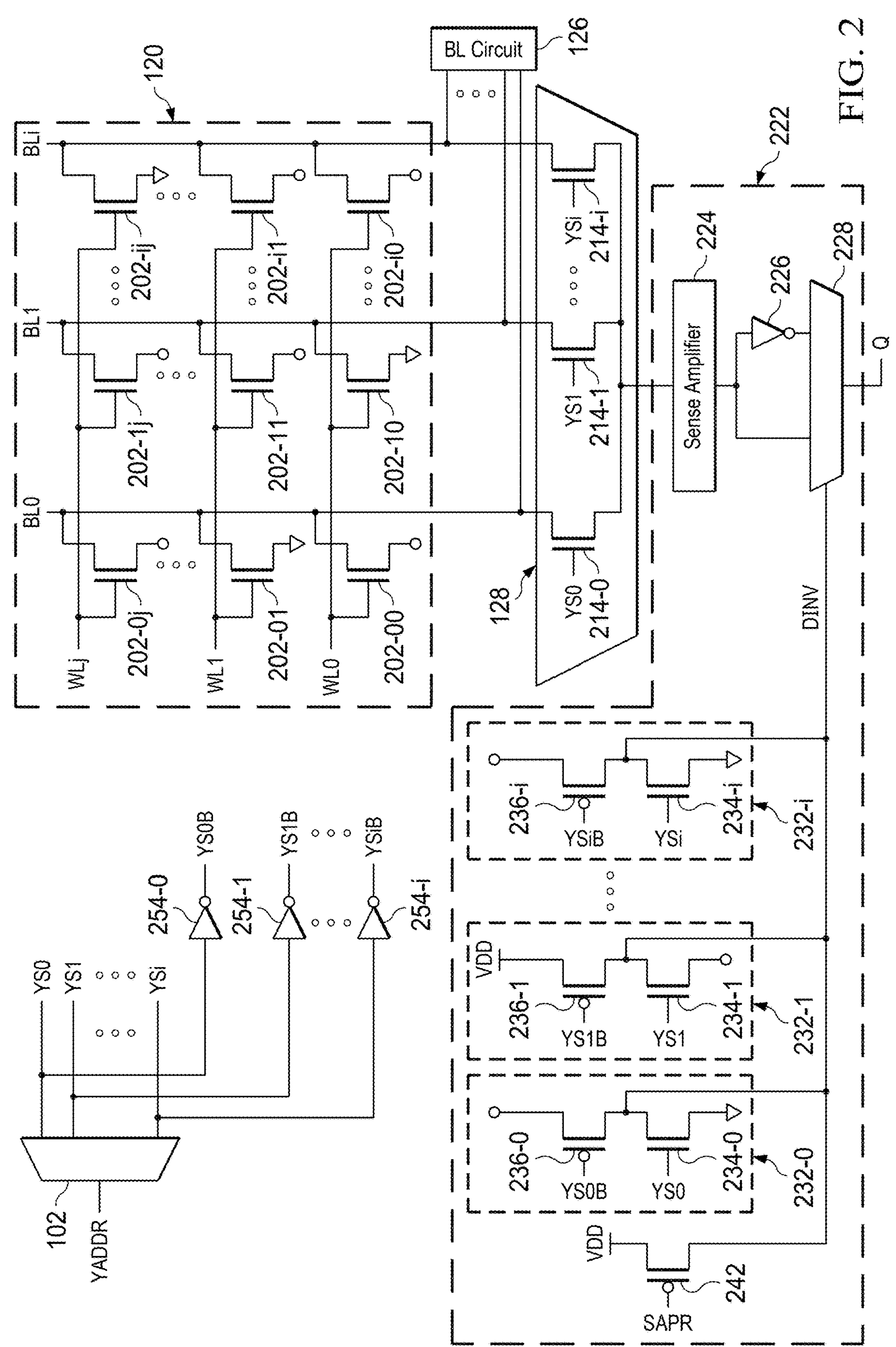
FIG. 2 is a circuit schematic including a memory bank and a logic inversion circuit according to some examples.

FIG. 2 is a circuit schematic including a memory bank 120 and a logic inversion circuit 222 according to some examples. The logic inversion circuit 222 is an example of the logic inversion circuit 122 of FIG. 1.

The memory bank 120 has (i+1) bit lines BL0, BL1, . . . BLi and (j+1) word lines WL0, WL1, . . . WLj. The memory bank 120 includes memory cells, where a respective memory cell is at an intersection of a respective bit line and a respective word line. Each memory cell is configured to store a logical "0" or a logical "1". The memory bank 120 in this example includes ROM, although other memory technologies may be implemented in other examples. Each memory cell of the ROM in the memory bank 120 includes a pull-down transistor 202-*gh*, where g and h indicate a column and a row, respectively, in which the memory cell is disposed within the memory bank 120. The pull-down transistors 202 in the illustrated example are n-type transistors, such as n-type field effect transistors (nFETs).

As schematically illustrated, the pull-down transistor 202-*gh* has (i) a first source/drain node that is electrically connected to a respective bit line BLg, (ii) a second source/drain node that is electrically connected to a grounded power supply node (e.g., a VSS or ground node) (e.g., a grounded power supply node connected to pull-down transistor 202-01) or is electrically floating (e.g., an electrically floating source/drain node of pull-down transistor 202-00), and (iii) a gate node that is electrically connected to a respective word line WLh. The schematic representation of the second source/drain node of a pull-down transistor 202-*gh* being electrically floating indicates that that pull-down transistor 202-*gh* is disabled from pulling down a voltage of the respective bit line BLg when the respective word line WLh is asserted. The pull-down transistor 202-*gh* being disabled from pulling down the voltage of the bit line BLg may take any of multiple configurations. For example, the first source/drain node of the pull-down transistor 202-*gh* may be electrically floating (e.g., not electrically connected to the bit line BLg); the second source/drain node of the pull-down transistor 202-*gh* may be electrically floating (e.g., not electrically connected to the grounded power supply node; and/or the first and second source/drain nodes may be electrically connected together (e.g., electrically shorted), which may be electrically connected to either the bit line BLg or the grounded power supply node.

Whether the pull-down transistor 202-*gh* is disabled from pulling down a voltage of the respective bit line BLg indicates whether the datum stored by the memory cell is a logical "0" (and conversely, a logical "1"). If the first source/drain node is electrically connected to the bit line and the second source/drain node is electrically connected to the grounded power supply node, the pull-down transistor 202-*gh* of the memory cell is capable of pulling down a voltage of the respective bit line BLg when the word line WLh is asserted, and the datum stored by the memory cell is a logical "0". If the pull-down transistor 202-*gh* is disabled from pulling down a voltage of the respective bit line BLg, the datum stored by the memory cell is a logical "1". For example, the pull-down transistor 202-00 is disabled from pulling down a voltage of the bit line BL0, and hence, the memory cell that includes the pull-down transistor 202-00 stores a logical "1". As another example, the first source/drain node of pull-down transistor 202-01 is electrically connected to the bit line BL0, and the second source/drain node of pull-down transistor 202-01 is electrically connected to the grounded power supply node. Hence, the memory cell that includes the pull-down transistor 202-01 stores a logical "0". In some examples, in the design and subsequent manufacture of a memory cell in a memory bank 120, one or more metal vias in BEOL processing may be selectively inserted (e.g., by lithography mask design) to electrically connect various nodes or to not electrically connect nodes (e.g., to keep a node electrically floating).

In the illustrated example, columns of memory cells (e.g., along respective bit lines) are programmed to be a majority of logical "1". The data stored in the memory cells may be selectively inverted on a column-by-column basis to achieve the majority of logical "1" of the respective column. For example, if half or more of the data to be stored in a column is a logical "1", the stored data of that column may be non-inverted, and if more than half of the data to be stored in a column is a logical "0", the stored data of that column may be inverted. As described in more detail subsequently, in the illustrated example, the data stored in the columns of memory cells along the bit lines BL0 and BLi are inverted, and the data stored in the column of memory cells along the bit line BL1 are non-inverted.

The multiplexer 128 has input nodes electrically connected to the respective bit lines BL0 through BLi. Although not illustrated, the bit line circuit 126 is electrically connected to the bit lines BL0 through BLi, e.g., to pre-charge a respective bit line in a read operation. The multiplexer 128 includes mux transistors 214-0, 214-1, . . . 214-*i* (collectively or individually, mux transistor(s) 214). The mux transistors 214 in the illustrated example are n-type transistors, such as nFETs. For each mux transistor 214, a first source/drain node of the respective mux transistor 214-*g* is electrically connected to a respective bit line BLg. Second source/drain nodes of the mux transistors 214 are electrically connected together as the output node of the multiplexer 128. For each mux transistor 214, a gate node of the respective mux transistor 214-*g* is electrically connected to a respective select node YSg.

The logic inversion circuit 222 includes a sense amplifier 224, an inverter 226, and a multiplexer 228. An input node of the sense amplifier 224 is an input node of the logic inversion circuit 222 and is electrically connected to the output node of the multiplexer 128. An output node of the sense amplifier 224 is electrically connected to an input node of the inverter 226 and a first input node of the multiplexer 228. An output node of the inverter 226 is electrically connected to a second input node of the multiplexer 228. An output node of the multiplexer 228 is the output node Q of the logic inversion circuit 222.

The logic inversion circuit 222 also includes column inversion tag (CIT) circuits 232-0, 232-1, . . . , 232-*i* (collectively or individually, CIT circuit(s) 232). Each CIT circuit 232 is configured to indicate whether a corresponding column of the memory bank 120 (e.g., memory cells electrically connected to a same bit line) stores non-inverted data or inverted data. For example, the CIT circuit 232-0 is configured to indicate whether memory cells electrically connected to the bit line BL0 store non-inverted data or inverted data; the CIT circuit 232-1 is configured to indicate whether memory cells electrically connected to the bit line BL1 store non-inverted data or inverted data; etc.

Each CIT circuit 232-*g* includes a pull-down transistor 234-*g* (e.g., an nFET) and a pull-up transistor 236-*g* (e.g., a p-type field effect transistor (pFET)). Respective drain nodes of the pull-down transistor 234-*g* and the pull-up transistor 236-*g* are electrically connected together as a data inversion control node, which is or is electrically connected to a data inversion selection node DINV.

Either the source node of the pull-down transistor 234-*g* is electrically connected to a grounded power supply node (e.g., a VSS or ground node), or the source node of the pull-up transistor 236-*g* is electrically connected to a positive power supply node (e.g., a VDD node). Either the pull-down transistor 234-*g* is configured to pull down a voltage of the data inversion control node (and hence, the data inversion selection node DINV), or the pull-up transistor 236-*g* is configured to maintain a logical "1" state of the data inversion control node (and hence, the data inversion selection node DINV). The other of the pull-down transistor 234-*g* and the pull-up transistor 236-*g* is disabled from pulling down or up the voltage of the data inversion control node.

As an example, in the CIT circuit 232-0, the source node of the pull-down transistor 234-0 is electrically connected to a grounded power supply node (e.g., a VSS or ground node) to configure the pull-down transistor 234-0 to pull down the voltage of the data inversion control node, and the source node of the pull-up transistor 236-0 is electrically floating to disable the pull-up transistor 236-0 from pulling up the voltage of the data inversion control node. As another example, in the CIT circuit 232-1, the source node of the pull-up transistor 236-1 is electrically connected to a positive power supply node (e.g., a VDD node) to configure the pull-up transistor 236-1 to maintain the logical "1" state of the data inversion control node, and the source node of the pull-down transistor 234-1 is electrically floating to disable the pull-down transistor 234-1 from pulling down the voltage of the data inversion control node. The electrical connections of the source nodes of the pull-down transistor 234-*g* and the pull-up transistor 236-*g* indicate whether the column of the memory bank 120 corresponding to the CIT circuit 232-*g* is programmed with non-inverted data or inverted data.

For each CIT circuit 232-*g*, a gate node of the pull-down transistor 234-*g* is electrically connected to a respective select node YSg, and a gate node of the pull-up transistor 236-*g* is electrically connected to a respective complementary select node YSgB. For example, in the CIT circuit 232-0, the gate node of the pull-down transistor 234-0 is electrically connected to a select node YS0, and the gate node of the pull-up transistor 236-0 is electrically connected to a complementary select node YS0B. As another example, in the CIT circuit 232-1, the gate node of the pull-down transistor 234-1 is electrically connected to a select node YS1, and the gate node of the pull-up transistor 236-1 is electrically connected to a complementary select node YS1B.

The logic inversion circuit 222 further includes a pre-charge transistor 242. In the illustrated example, the pre-charge transistor 242 is a p-type transistor (e.g., a pFET). A drain node of the pre-charge transistor 242 is electrically connected to a positive power supply node (e.g., a VDD node). A source node of the pre-charge transistor 242 is electrically connected to the data inversion selection node DINV. A gate node of the pre-charge transistor 242 is electrically connected to a sense amp pre-charge control node SAPR. The data inversion selection node DINV is electrically connected to a selection input node of the multiplexer 228.

The decoder 102 includes output nodes that are the select nodes YS0, YS1, . . . , YSi. Address nodes YADDR (e.g., a multi-bit address) are electrically connected to input nodes of the decoder 102. The decoder 102 is configured to decode an address input on the address nodes YADDR and decode the address to selectively assert a signal (e.g., a logical "1") on one of the select nodes YS0, YS1, . . . , YSi while the other select nodes YS0, YS1, . . . , YSi remain de-asserted (e.g., logical "0"). The decoder 102 may de-assert all of the select nodes YS0, YS1, . . . , YSi at a time. Inverters 254-0, 254-1, . . . , 254-*i* have input nodes electrically connected to respective select nodes YS0, YS1, . . . , YSi, and the output nodes of the inverters 254-0, 254-1, . . . , 254-*i* are or are electrically connected to the respective complementary select nodes YS0B, YS1B, . . . , YSiB. The decoder 102 may also include an output node that is the sense amp pre-charge control node SAPR.

As described in more detail subsequently, asserting a signal on a select node YSg by the decoder 102 permits the corresponding one mux transistor 214-*g* to be in a closed or conducting state, while the other mux transistors 214 remain in an open or non-conducting state. Similarly, asserting a signal on a select node YSg by the decoder 102 permits the pull-down transistor 234-*g* and pull-up transistor 236-*g* of the corresponding CIT circuit 232-*g* to be in a closed or conducting state, with other pull-down transistors 234 and pull-up transistors 236 of the other CIT circuits 232 remaining in an open or non-conducting state. Depending on which of the pull-down transistor 234-*g* and pull-up transistor 236-*g* of the CIT circuit 232-*g* is disabled or configured to pull down the voltage or maintain a logical "1" state of the data inversion control node when the signal on the corresponding select node YSg is asserted, the voltage of the data inversion selection node DINV may be pulled down to a logical "0" or remain in a logical "1". The logical state of the data inversion selection node DINV causes the multiplexer 228 to selectively output to the output node Q the inverted version of the datum (e.g., from the inverter 226) or the non-inverted version of the datum (e.g., from the sense amplifier 224) received from the memory bank 120 and passed through the multiplexer 128.

Figure 3A:
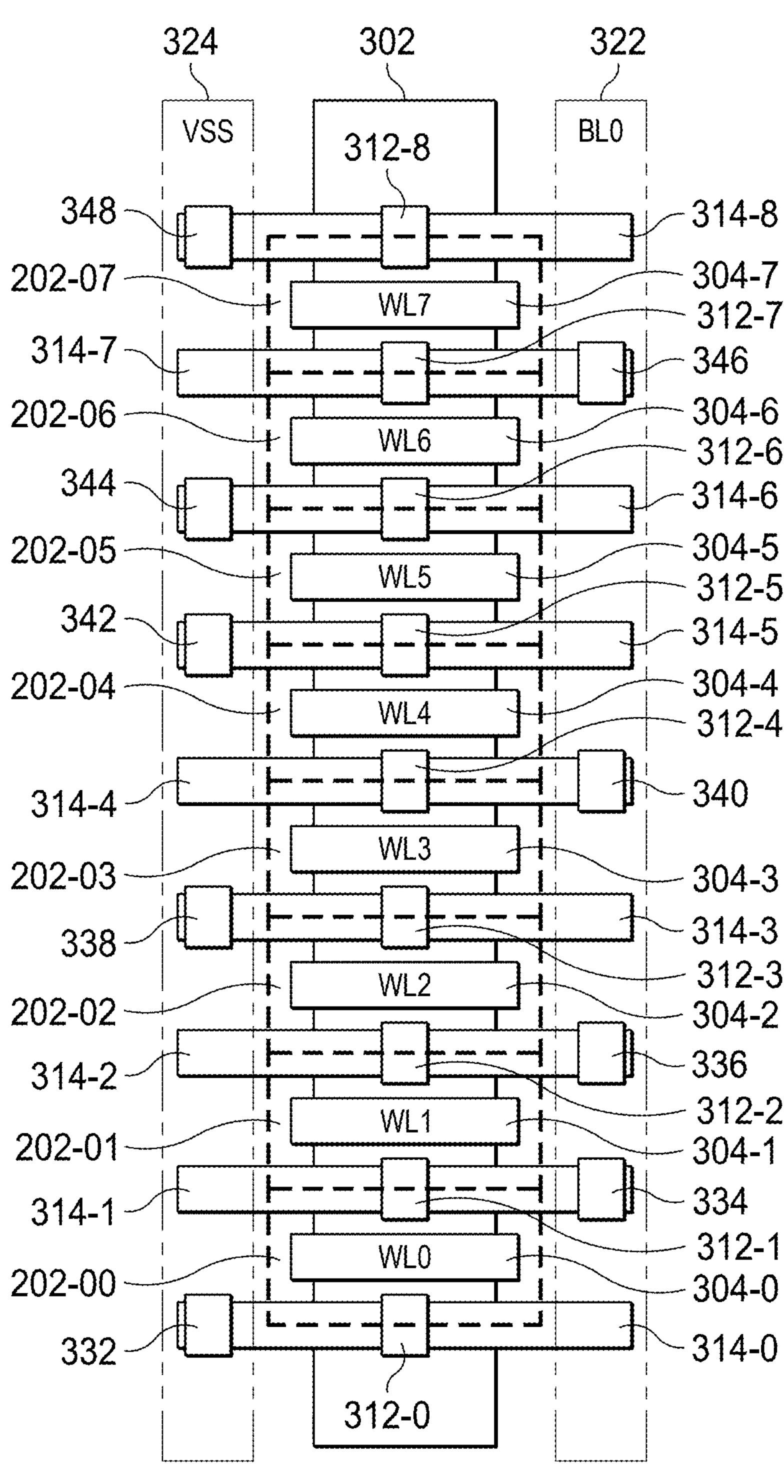
FIGS. 3A and 3B illustrate in a layout view and a schematic, respectively, a column of eight memory cells of a memory bank along a nominal bit line that are configured to store a majority of logical "0".
Figure 3B:
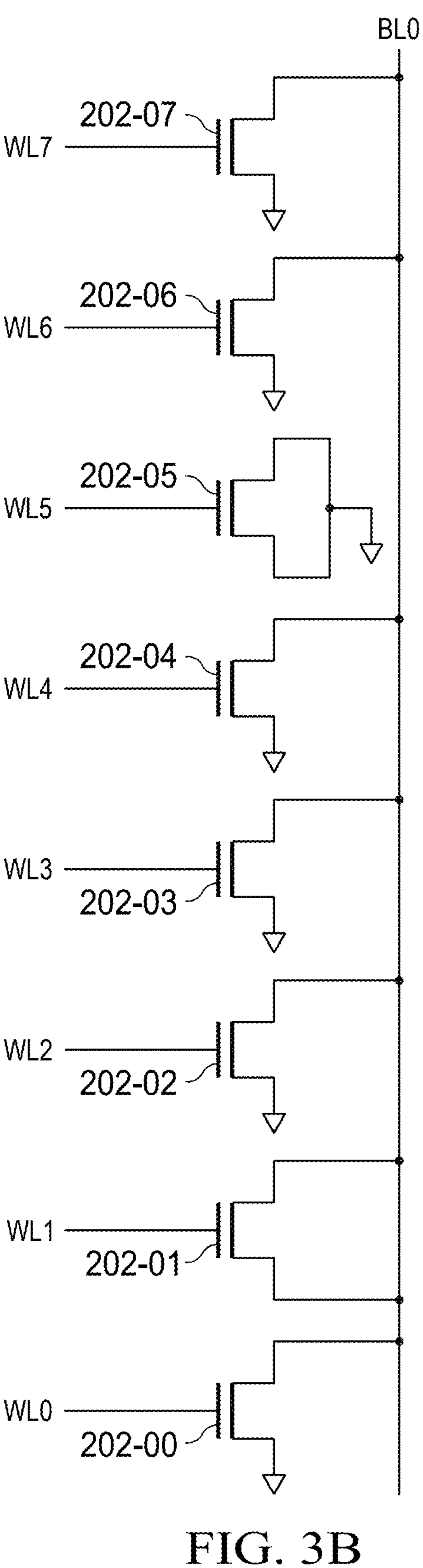

FIGS. 3A and 3B illustrate in a layout view and a schematic, respectively, a column of eight memory cells of a memory bank along a nominal bit line BL0 that are configured to store a majority of logical "0". FIG. 3A shows an active area 302 of a semiconductor substrate on which the pull-down transistors 202-00 through 202-07 of the column are formed. The source/drain regions (e.g., doped regions) of the pull-down transistors 202-00 through 202-07 are formed in the active area 302 of the semiconductor substrate. Gate electrodes 304-0 through 304-7 of the pull-down transistors 202-00 through 202-07 are on the active area 302 between the source/drain regions of the respective pull-down transistor 202-00 through 202-07. A source/drain region in this example is shared between neighboring pull-down transistors 202-00 through 202-07. For example, a shared source/drain region is shared between the pull-down transistors 202-00, 202-01; another shared source/drain region is shared between the pull-down transistors 202-01, 202-02; etc. Source/drain regions at ends of the column may be shared with a dummy transistor or unshared, although such source/drain regions are also included within shared source/drain regions solely for convenience herein.

Shared source/drain metal contacts 312-0 through 312-8 electrically connect to respective shared source/drain regions. Transverse metal lines 314-0 through 314-8 electrically connect to (e.g., contact) respective shared source/drain metal contacts 312-0 through 312-8. A bit line BL0 metal line 322 and a grounded power supply (VSS) metal line 324 extend parallel to the column (e.g., to a longitudinal axis of the active area 302). The active area 302 is laterally between the bit line BL0 metal line 322 and the VSS metal line 324. Each transverse metal line 314-0 through 314-8 traverses the bit line BL0 metal line 322, the VSS metal line 324, and a respective shared source/drain metal contact 312-0 through 312-8.

Programming metal vias 332, 334, 336, 338, 340, 342, 344, 346, 348 are inserted in the layout of FIG. 3A to program the memory cells of the column. FIG. 3B schematically shows this programming. Programming metal via 332 contacts and electrically connects the transverse metal line 314-0 and the VSS metal line 324. Programming metal via 334 contacts and electrically connects the transverse metal line 314-1 and the bit line BL0 metal line 322. Hence, the pull-down transistor 202-00 is electrically connected between the bit line BL0 and the grounded power supply node (e.g., a VSS or ground node) through the programming metal vias 332, 334, as schematically shown in FIG. 3B, to store a logical "0". Programming metal via 336 contacts and electrically connects the transverse metal line 314-2 and the bit line BL0 metal line 322. Hence, the pull-down transistor 202-01 is disabled from pulling down a voltage of the bit line BL0 metal line 322 to store a logical "1", since both source/drain regions are electrically connected to the bit line BL0 through the programming metal vias 334, 336, as schematically shown in FIG. 3B.

Programming metal vias 338, 342 contact and electrically connect the transverse metal lines 314-3, 314-5, respectively, and the VSS metal line 324. Programming metal via 340 contacts and electrically connects the transverse metal line 314-4 and the bit line BL0 metal line 322. The pull-down transistor 202-02 is electrically connected between the bit line BL0 and the grounded power supply node (e.g., a VSS or ground node) through the programming metal vias 336, 338, as schematically shown in FIG. 3B, to store a logical "0". The pull-down transistor 202-03 is electrically connected between the bit line BL0 and the grounded power supply node (e.g., a VSS or ground node) through the programming metal vias 338, 340, as schematically shown in FIG. 3B, to store a logical "0". The pull-down transistor 202-04 is electrically connected between the bit line BL0 and the grounded power supply node (e.g., a VSS or ground node) through the programming metal vias 340, 342, as schematically shown in FIG. 3B, to store a logical "0".

Programming metal via 344 contacts and electrically connects the transverse metal line 314-6 and the VSS metal line 324. Hence, the pull-down transistor 202-05 is disabled from pulling down a voltage of the bit line BL0 metal line 322 to store a logical "1", since both source/drain regions are electrically connected to the VSS metal line 324 through the programming metal vias 342, 344 and are electrically disconnected from the bit line BL0 metal line 322, as schematically shown in FIG. 3B.

Programming metal via 346 contacts and electrically connects the transverse metal line 314-7 and the bit line BL0 metal line 322. The pull-down transistor 202-06 is electrically connected between the bit line BL0 and the grounded power supply node (e.g., a VSS or ground node) through the programming metal vias 344, 346, as schematically shown in FIG. 3B, to store a logical "0". Programming metal via 348 contacts and electrically connects the transverse metal line 314-8 and the VSS metal line 324. The pull-down transistor 202-07 is electrically connected between the bit line BL0 and the grounded power supply node (e.g., a VSS or ground node) through the programming metal vias 346, 348, as schematically shown in FIG. 3B, to store a logical "0".

Figure 3C:
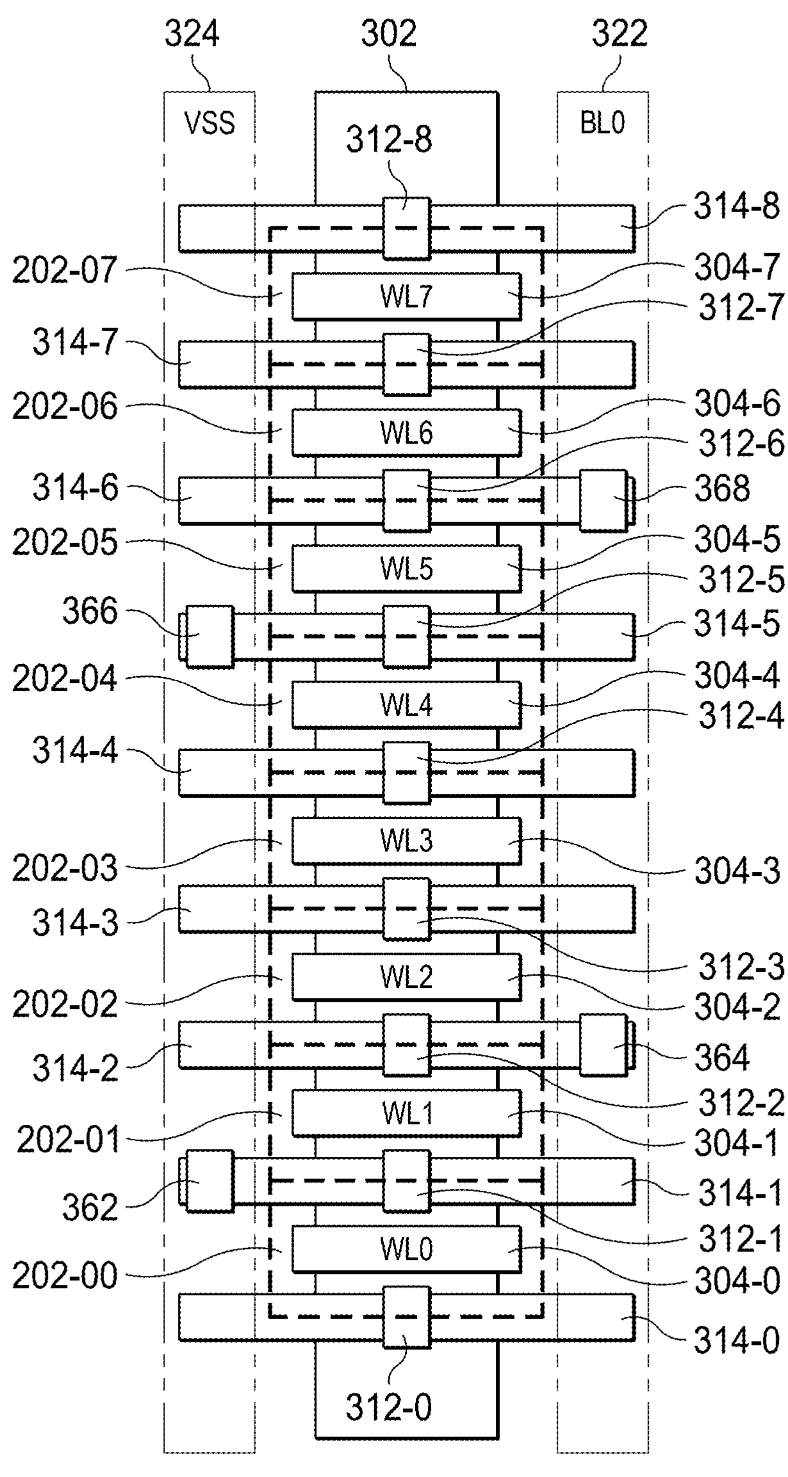
FIGS. 3C and 3D illustrate in a layout view and a schematic, respectively, a column of eight memory cells of a memory bank along a nominal bit line that are configured to store a majority of logical "1" as inverted data of what was stored in FIGS. 3A and 3B, according to some examples.
Figure 3D:
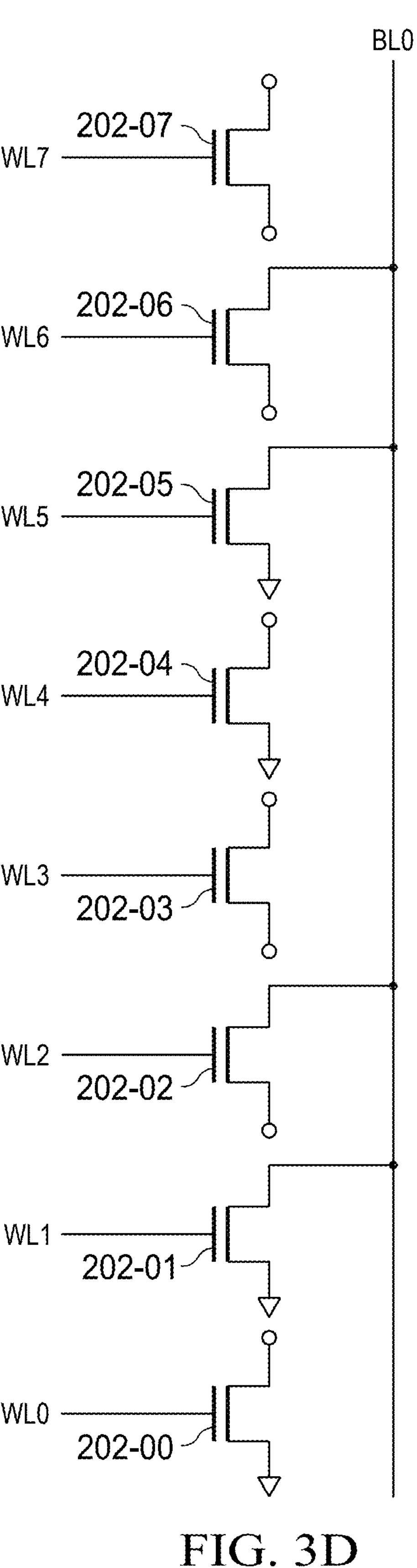

FIGS. 3C and 3D illustrate in a layout view and a schematic, respectively, a column of eight memory cells of a memory bank along a nominal bit line BL0 that are configured to store a majority of logical "1" as inverted data of what was stored in FIGS. 3A and 3B. The layout of FIG. 3C is the same as the layout of FIG. 3A, except that different programming metal vias are present to implement storing inverted data. Programming metal vias 362, 364, 366, 368 are inserted in the layout of FIG. 3C to program the memory cells of the column. FIG. 3D schematically shows this programming.

No programming metal via contacts and electrically connects the transverse metal lines 314-0, 314-3, 314-4, 314-7, 314-8 to any of the bit line BL0 metal line 322 and the VSS metal line 324. Programming metal via 362 contacts and electrically connects the transverse metal line 314-1 and the VSS metal line 324. The pull-down transistor 202-00 is disabled from pulling down a voltage of the bit line BL0 metal line 322 to store a logical "1", since no source/drain region of the pull-down transistor 202-01 is electrically connected to the bit line BL0 metal line 322, as schematically shown in FIG. 3B. One source/drain region of the pull-down transistor 202-00 is electrically floating, and the other source/drain region of the pull-down transistor 202-00 is electrically connected to the grounded power supply node (e.g., a VSS or ground node).

Programming metal via 364 contacts and electrically connects the transverse metal line 314-2 and the bit line BL0 metal line 322. The pull-down transistor 202-01 is electrically connected between the bit line BL0 and the grounded power supply node (e.g., a VSS or ground node) through the programming metal vias 362, 364, as schematically shown in FIG. 3B, to store a logical "0". The pull-down transistor 202-02 is disabled from pulling down a voltage of the bit line BL0 metal line 322 to store a logical "1", since no source/drain region of the pull-down transistor 202-02 is electrically connected to the VSS metal line 324, as schematically shown in FIG. 3B. One source/drain region of the pull-down transistor 202-02 is electrically connected to the bit line BL0, and the other source/drain region of the pull-down transistor 202-02 is electrically floating. The pull-down transistor 202-03 is disabled from pulling down a voltage of the bit line BL0 metal line 322 to store a logical "1", since no source/drain region of the pull-down transistor 202-02 is electrically connected to the BL0 metal line 322, as schematically shown in FIG. 3B. Both source/drain regions of the pull-down transistor 202-03 are electrically floating.

Programming metal via 366 contacts and electrically connects the transverse metal line 314-5 and the VSS metal line 324. The pull-down transistor 202-04 is disabled from pulling down a voltage of the bit line BL0 metal line 322 to store a logical "1", since no source/drain region of the pull-down transistor 202-04 is electrically connected to the bit line BL0 metal line 322, as schematically shown in FIG. 3B. One source/drain region of the pull-down transistor 202-04 is electrically floating, and the other source/drain region of the pull-down transistor 202-04 is electrically connected to the grounded power supply node (e.g., a VSS or ground node).

Programming metal via 368 contacts and electrically connects the transverse metal line 314-6 and the bit line BL0 metal line 322. The pull-down transistor 202-05 is electrically connected between the bit line BL0 and the grounded power supply node (e.g., a VSS or ground node) through the programming metal vias 366, 368, as schematically shown in FIG. 3B, to store a logical "0". The pull-down transistor 202-06 is disabled from pulling down a voltage of the bit line BL0 metal line 322 to store a logical "1", since no source/drain region of the pull-down transistor 202-06 is electrically connected to the VSS metal line 324, as schematically shown in FIG. 3B. One source/drain region of the pull-down transistor 202-06 is electrically connected to the bit line BL0, and the other source/drain region of the pull-down transistor 202-06 is electrically floating. The pull-down transistor 202-07 is disabled from pulling down a voltage of the bit line BL0 metal line 322 to store a logical "1", since no source/drain region of the pull-down transistor 202-07 is electrically connected to the BL0 metal line 322, as schematically shown in FIG. 3B. Both source/drain regions of the pull-down transistor 202-07 are electrically floating. FIG. 3E is a table summarizing the storage of data described above in FIGS. 3A through 3D.

Figure 4A:
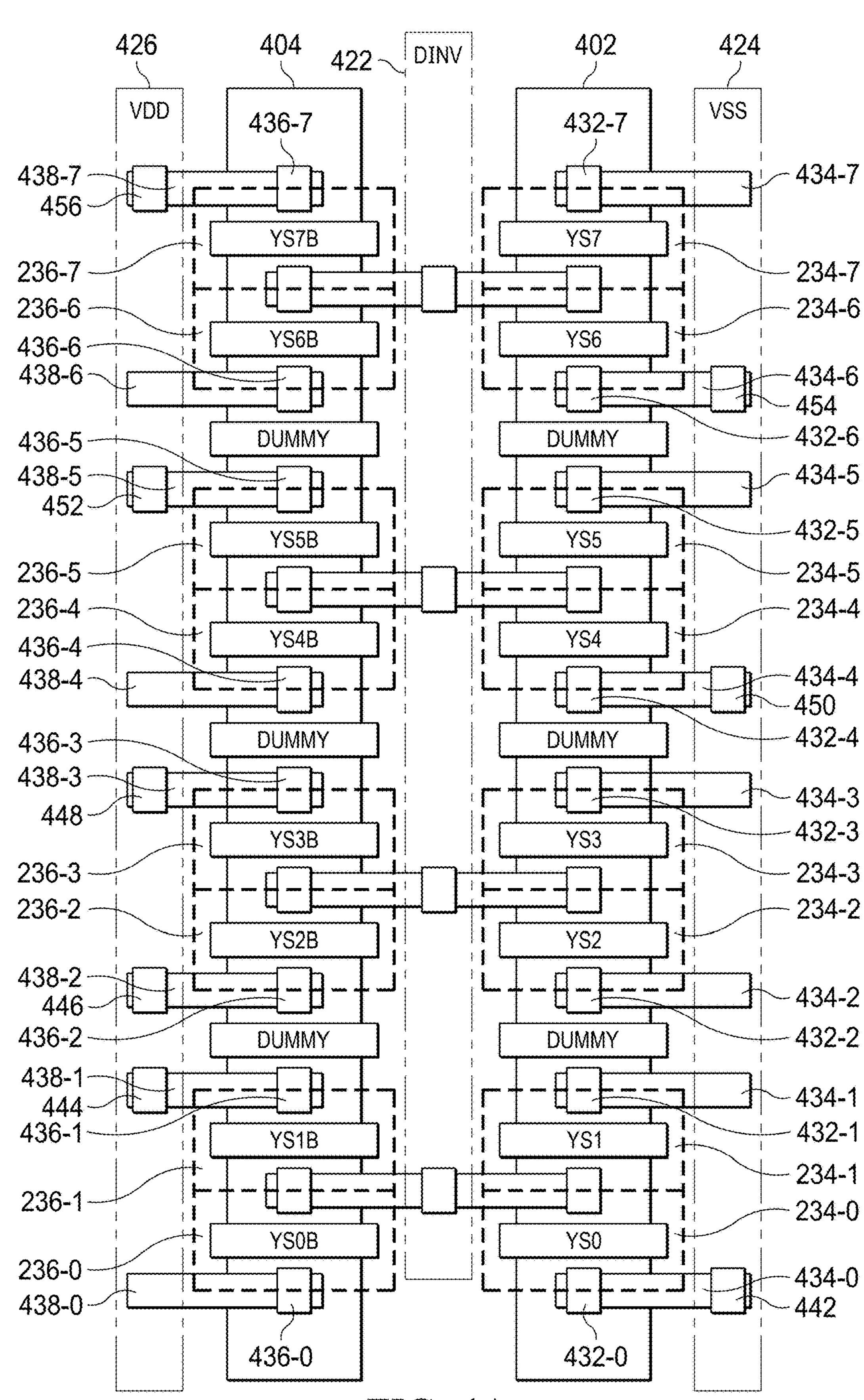
FIGS. 4A and 4B illustrate in a layout view and a schematic, respectively, eight column inversion tag (CIT) circuits for corresponding eight columns of memory cells of a memory bank according to some examples.
Figure 4B:
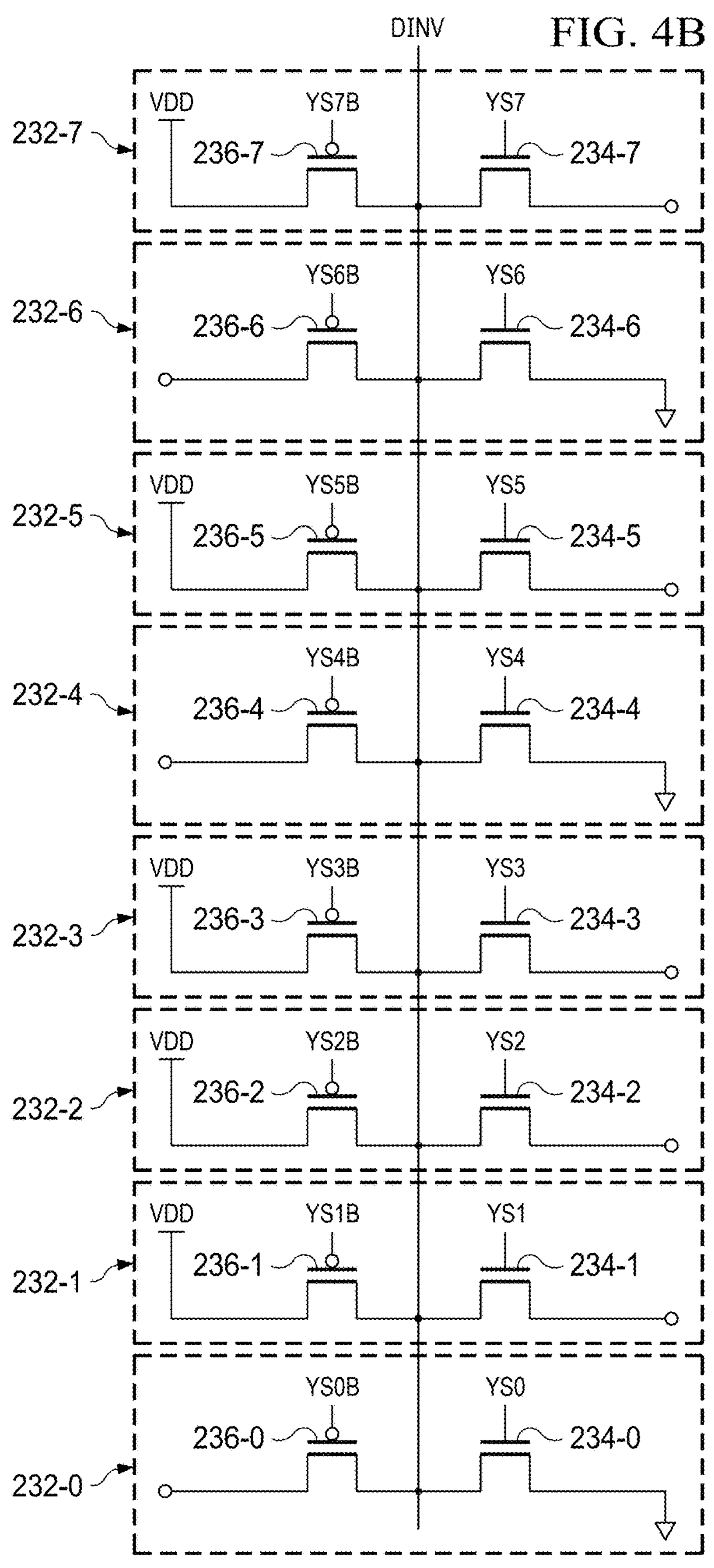

FIGS. 4A and 4B illustrate in a layout view and a schematic, respectively, eight CIT circuits 232-0 through 232-7 for corresponding eight columns of memory cells according to some examples. Components shown in FIG. 4A may be described below without a corresponding reference number to prevent obscuring features of FIG. 4A.

FIG. 4A shows a first active area 402 and a second active area 404 of a semiconductor substrate. The first active area 402 of the semiconductor substrate may include a p-doped well for n-type transistors, and the pull-down transistors 234-0 through 234-7 of the CIT circuits 232-0 through 232-7 are formed on the first active area 402. The second active area 404 of the semiconductor substrate may include an n-doped well for p-type transistors, and the pull-up transistors 236-0 through 236-7 of the CIT circuits 232-0 through 232-7 are formed on the second active area 404.

The source regions and the drain regions (e.g., doped regions) of the pull-down transistors 234-0 through 234-7 are formed in the first active area 402 of the semiconductor substrate. Gate electrodes of the pull-down transistors 234-0 through 234-7 are on the first active area 402 between the source region and the drain region of the respective pull-down transistor 234-0 through 234-7. A drain region in this example is shared between neighboring pull-down transistors 234-0 through 234-7. For example, a shared drain region is shared between the pull-down transistors 234-0, 234-1; another shared drain region is shared between the pull-down transistors 234-2, 234-3; etc.

The source regions and the drain regions (e.g., doped regions) of the pull-up transistors 236-0 through 236-7 are formed in the second active area 404 of the semiconductor substrate. Gate electrodes of the pull-up transistors 236-0 through 236-7 are on the second active area 404 between the source region and the drain region of the respective pull-up transistor 236-0 through 236-7. A drain region in this example is shared between neighboring pull-up transistors 236-0 through 236-7. For example, a shared drain region is shared between the pull-up transistors 236-0, 236-1; another shared drain region is shared between the pull-up transistors 236-2, 236-3; etc.

A DINV metal line 422, a VSS metal line 424, and a positive power supply (VDD) metal line 426 extend parallel to the longitudinal axes of the active areas 402, 404. The first active area 402 is laterally between the VSS metal line 424 and the DINV metal line 422, and the second active area 404 is laterally between the DINV metal line 422 and the VDD metal line 426. The shared drain regions of the pull-down transistors 234-0 through 234-7 and the pull-up transistors 236-0 through 236-7 are electrically connected to the DINV metal line 422 through respective drain metal contacts, transverse metal lines, and metal vias.

Source metal contacts 432-0 through 432-7 contact and electrically connect respective source regions of the pull-down transistors 234-0 through 234-7 and respective transverse metal lines 434-0 through 434-7. Source metal contacts 436-0 through 436-7 contact and electrically connect respective source regions of the pull-up transistors 236-0 through 236-7 and respective transverse metal lines 438-0 through 438-7.

Programming metal vias 442, 444, 446, 448, 450, 452, 454, 456 are inserted in the layout of FIG. 4A to configure the CIT circuits 232-0 through 232-7 to indicate whether the corresponding column of a memory bank stores non-inverted data or inverted data.

The programming metal via 442, 450, 454 contacts and electrically connects the transverse metal line 434-0, 434-4, 434-6, respectively, to the VSS metal line 424, and no metal via contacts and electrically connects the transverse metal line 438-0, 438-4, 438-6 to the VDD metal line 426. The source nodes of the pull-down transistors 234-0, 234-4, 234-6 are electrically connected to the grounded power supply node (e.g., a VSS or ground node), and the source nodes of the pull-up transistors 236-0, 236-4, 236-6 are electrically floating, as shown schematically in FIG. 4B.

No metal via contacts and electrically connects the transverse metal line 434-1, 434-2, 434-3, 434-5, 434-7 to the VSS metal line 424, and the programming metal via 444, 446, 448, 452, 456 contacts and electrically connects the transverse metal line 438-1, 438-2, 438-3, 438-5, 438-7, respectively, to the VDD metal line 426. The source nodes of the pull-down transistors 234-1, 234-2, 234-3, 234-5, 234-7 are electrically floating, and the source nodes of the pull-up transistors 236-1, 236-2, 236-3, 236-5, 236-7 are electrically connected to the positive power supply node (e.g., a VDD node), as shown schematically in FIG. 4B.

Figure 5A:
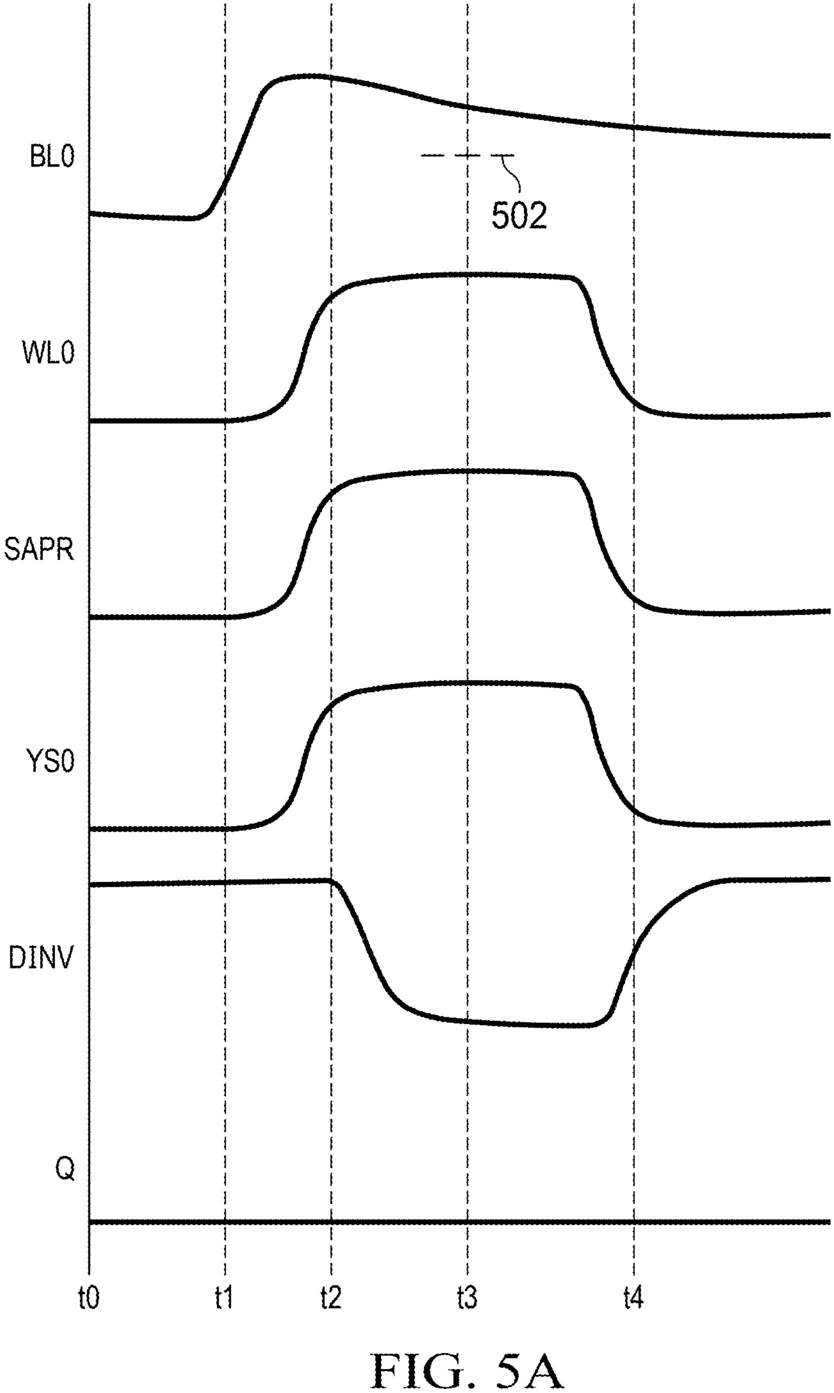
FIGS. 5A and 5B are charts of signals for reading a stored inverted datum according to some examples.
Figure 5B:
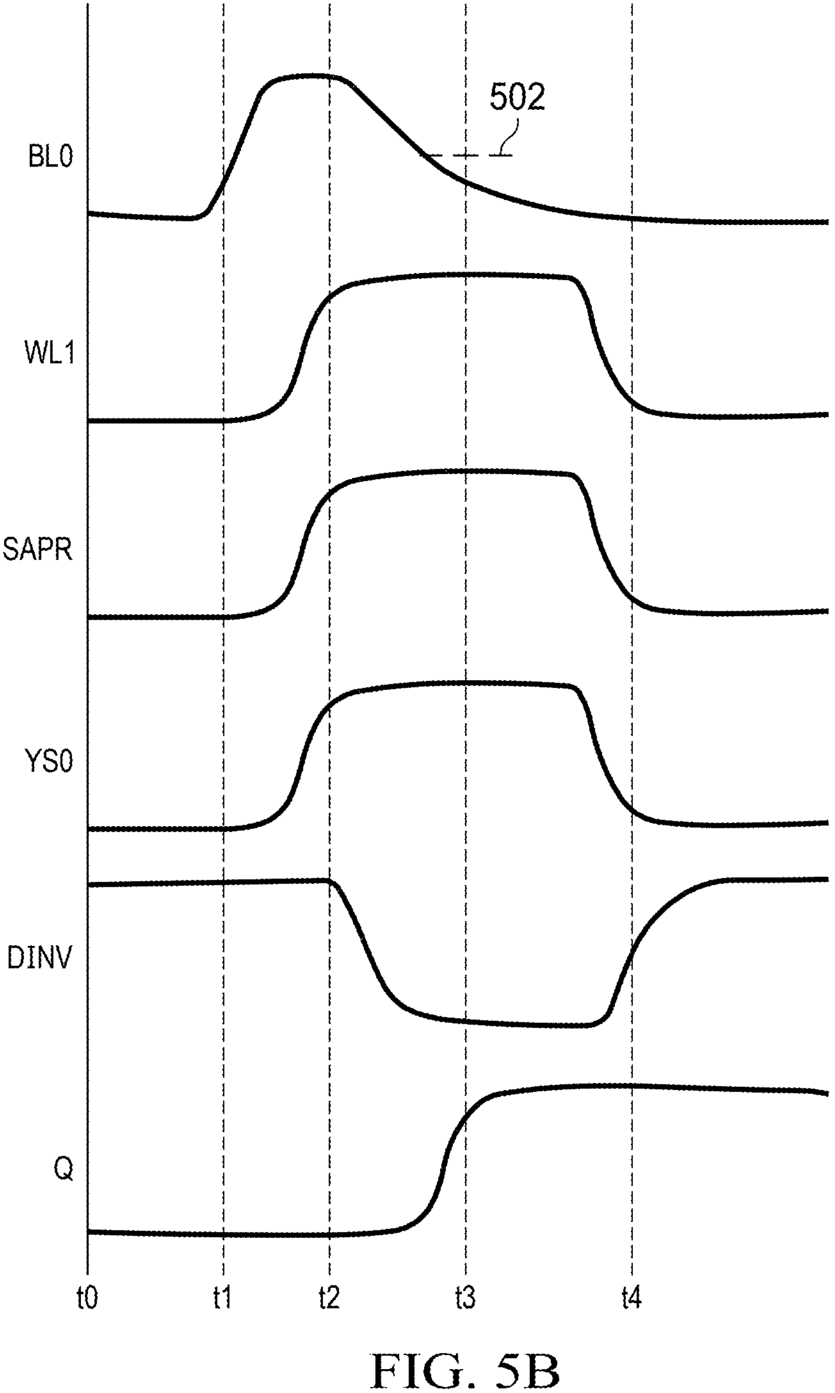

FIGS. 5A and 5B are charts of signals for reading a stored inverted datum according to some examples. FIG. 5A is a chart for reading a logical "0" that is a stored inverted datum as a logical "1", and FIG. 5B is a chart for reading a logical "1" that is a stored inverted datum as a logical "0". As an example, the signals of FIG. 5A are described in the context of reading the memory cell including the pull-down transistor 202-00 of FIG. 2, and the signals of FIG. 5B are described in the context of reading the memory cell including the pull-down transistor 202-01 of FIG. 2. As stated previously, the data stored in the column of memory cells along the bit line BL0 (e.g., including the memory cells that include the pull-down transistors 202-00, 202-01) are inverted.

Referring to FIG. 5A, at time t0, the WL0, SAPR, and YS0 signals are not asserted (e.g., a low voltage). Since the SAPR signal is not asserted, the pre-charge transistor 242 is in a closed or conducting state to pull the data inversion selection node DINV up to a high voltage (e.g., the voltage of a VDD node). Also at time t0, the bit line BL0 is floating at a low voltage.

At time t1, the bit line BL0 begins to be pre-charged to a high voltage, for example, by the bit line circuit 126-0. Once charged to the high voltage, the circuit driving the bit line BL0 to that high voltage de-couples the source of the high voltage from the bit line BL0 (e.g., before time t2).

At time t2, the WL0, SAPR, and YS0 signals are asserted (e.g., a high voltage). With the WL0 signal changing from not asserted to asserted, the pull-down transistor 202-00 may change from an open or non-conducting state to a closed or conducting state. However, since the pull-down transistor 202-00 is disabled from pulling down a voltage of the bit line BL0, the pull-down transistor 202-00 does not discharge the bit line BL0 even if the pull-down transistor 202-00 changes to a closed or conducting state. The bit line BL0 may slightly discharge due to leakage from other pull-down transistors 202-0*x* electrically connected to the bit line BL0.

With the SAPR signal changing from not asserted to asserted, the pre-charge transistor 242 changes from a closed or conducting state to an open or non-conducting state to de-couple the data inversion selection node DINV from the VDD node. With the YS0 signal changing from not asserted to asserted (and inversely, the YS0B signal changing from asserted to not asserted), the pull-down transistor 234-0 of the CIT circuit 232-0 changes from an open or non-conducting state to a closed or conducting state, and the pull-up transistor 236-0 of the CIT circuit 232-0 may change from an open or non-conducting state to a closed or conducting state. With the pull-up transistor 236-0 disabled from pulling up the voltage of the data inversion selection node DINV and the pull-down transistor 234-0 in a closed or conducting state, the voltage of the data inversion selection node DINV is discharged through the pull-down transistor 234-0.

Further, with the YS0 signal changing from not asserted to asserted, the mux transistor 214-0 of the multiplexer 128 changes from an open or non-conducting state to a closed or conducting state and passes the voltage on the bit line BL0 to the input node of the sense amplifier 224. The sense amplifier 224, whether by an externally provided reference voltage or an intrinsic threshold voltage, determines whether the voltage passed from the bit line BL0 is above a sense voltage threshold 502. When the voltage on the bit line BL0 is above the sense voltage threshold 502, like from time t2 to a time t3, the sense amplifier 224 outputs to the first input node of the multiplexer 228 and the input node of the inverter 226 a logical "1". The inverter 226 inverts the logical "1" and outputs a logical "0" to the second input node of the multiplexer 228. With the data inversion selection node DINV being a low voltage (e.g., a logical "0"), the multiplexer 228 outputs the logical "0" as the Q signal, which may be sampled at time t3. Thereafter, at time t4, the WL0, SAPR, and YS0 signals are not asserted, in preparation for another read operation to be performed.

Referring to FIG. 5B, as described above with respect to FIG. 5A, at time to, the WL1, SAPR, and YS0 signals are not asserted (e.g., a low voltage); the data inversion selection node DINV is pulled up to a high voltage (e.g., the voltage of the VDD node); and the bit line BL0 is floating at a low voltage. At time t1, the bit line BL0 begins to be pre-charged to a high voltage, like described above with respect to FIG. 5A.

At time t2, the WL1, SAPR, and YS0 signals are asserted (e.g., a high voltage). With the WL1 signal changing from not asserted to asserted, the pull-down transistor 202-01 changes from an open or non-conducting state to a closed or conducting state. The pull-down transistor 202-01 is configured to pull down a voltage of the bit line BL0 by the pull-down transistor 202-01 being electrically connected between the bit line BL0 and the grounded power supply node (e.g., a VSS or ground node). Hence, the pull-down transistor 202-01 discharges the bit line BL0 to a low voltage.

The SAPR and YS0 signals changing from not asserted to asserted control the voltage on the data inversion selection node DINV as described above with respect to FIG. 5A. Further, with the YS0 signal changing from not asserted to asserted, the mux transistor 214-0 of the multiplexer 128 changes from an open or non-conducting state to a closed or conducting state and passes the voltage on the bit line BL0 to the input node of the sense amplifier 224. The sense amplifier 224 determines whether the voltage passed from the bit line BL0 is above the sense voltage threshold 502. When the voltage on the bit line BL0 is below the sense voltage threshold 502, for example leading up to time t3, the sense amplifier 224 outputs to the first input node of the multiplexer 228 and the input node of the inverter 226 a logical "0". The inverter 226 inverts the logical "0" and outputs a logical "1" to the second input node of the multiplexer 228. With the data inversion selection node DINV being a low voltage (e.g., a logical "0"), the multiplexer 228 outputs the logical "1" as the Q signal, which may be sampled at time t3. Thereafter, at time t4, the WL1, SAPR, and YS0 signals are not asserted, in preparation for the next read operation to be performed.

Figure 6A:
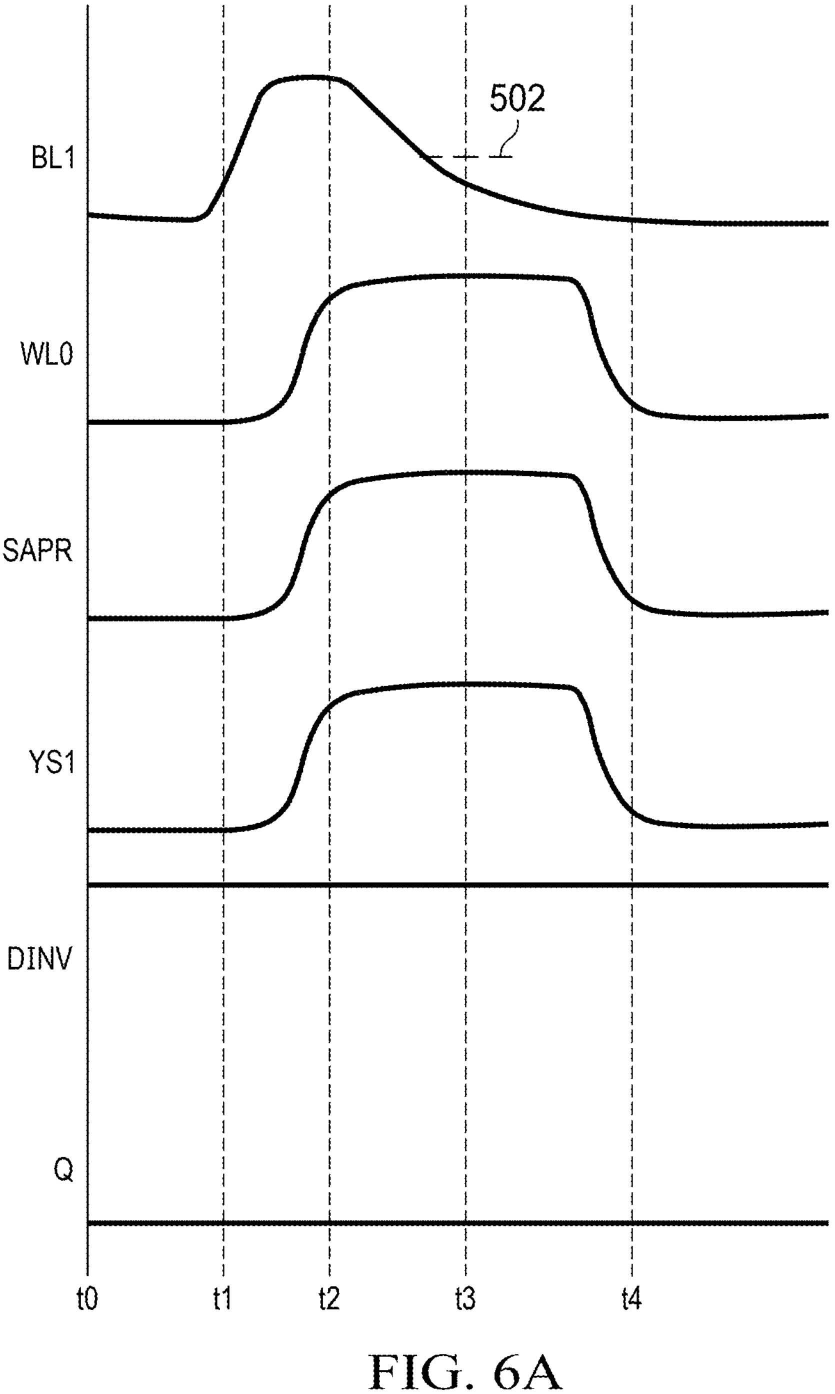
FIGS. 6A and 6B are charts of signals for reading a stored non-inverted datum according to some examples.
Figure 6B:
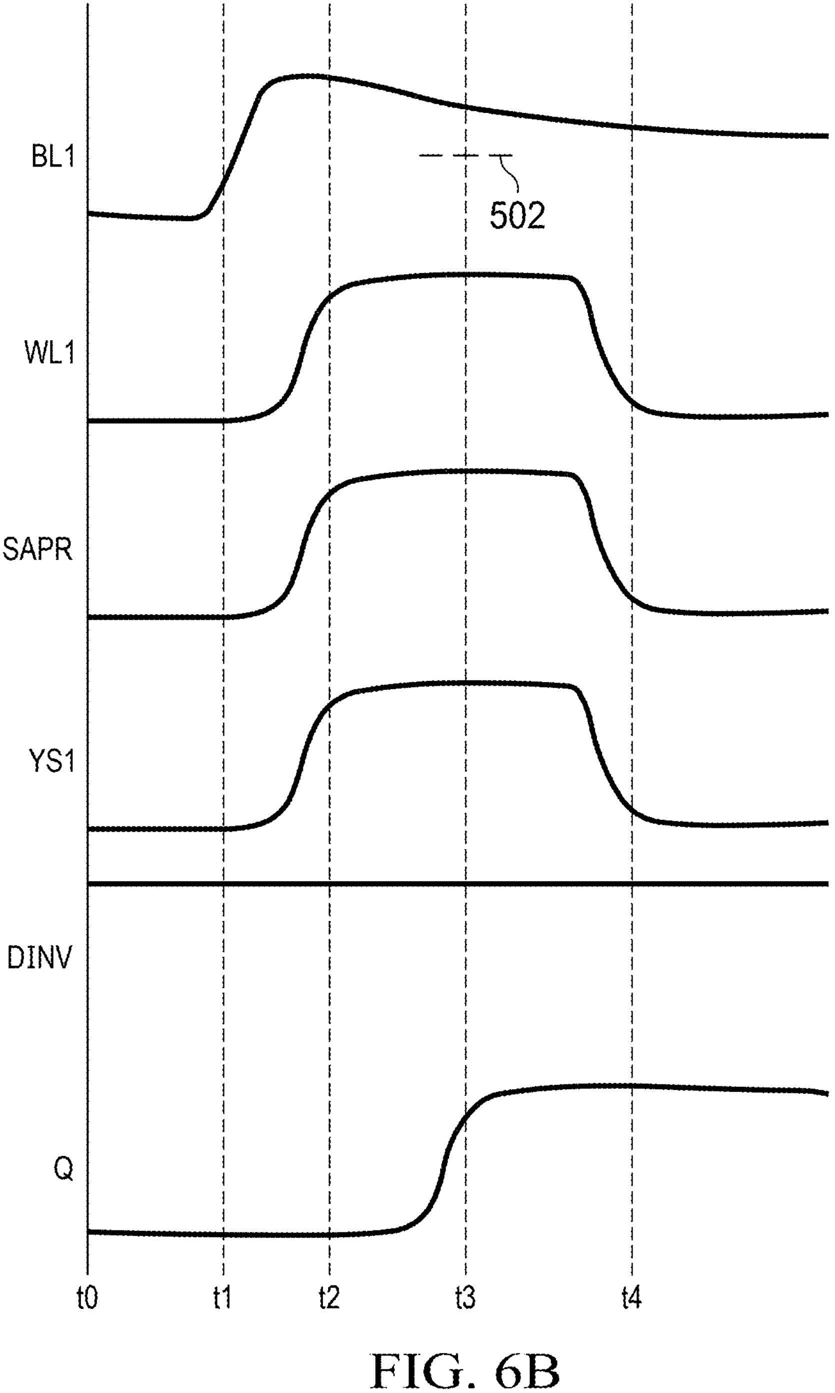

FIGS. 6A and 6B are charts of signals for reading stored non-inverted datum according to some examples. FIG. 6A is a chart for reading a logical "0" that is a stored non-inverted datum, and FIG. 6B is a chart for reading a logical "1" that is a stored non-inverted datum. As an example, the signals of FIG. 6A are described in the context of reading the memory cell including the pull-down transistor 202-10 of FIG. 2, and the signals of FIG. 6B are described in the context of reading the memory cell including the pull-down transistor 202-11 of FIG. 2. As stated previously, the data stored in the column of memory cells along the bit line BL1 (e.g., including the memory cells that include the pull-down transistors 202-10, 202-11) are not inverted.

Referring to FIG. 6A, at time to, the WL0, SAPR, and YS1 signals are not asserted (e.g., a low voltage). Since the SAPR signal is not asserted, the pre-charge transistor 242 is in a closed or conducting state to pull the data inversion selection node DINV up to a high voltage (e.g., the voltage of the VDD node). Also at time t0, the bit line BL1 is floating at a low voltage.

At time t1, the bit line BL1 begins to be pre-charged to a high voltage. Once charged to the high voltage, the circuit driving the bit line BL1 to that high voltage de-couples the source of the high voltage from the bit line BL1 (e.g., before time t2).

At time t2, the WL0, SAPR, and YS1 signals are asserted (e.g., a high voltage). With the WL0 signal changing from not asserted to asserted, the pull-down transistor 202-10 changes from an open or non-conducting state to a closed or conducting state. The pull-down transistor 202-10 is configured to pull down a voltage of the bit line BL1 by the pull-down transistor 202-10 being electrically connected between the bit line BL1 and the grounded power supply node (e.g., a VSS or ground node). Hence, the pull-down transistor 202-10 discharges the bit line BL1 to a low voltage.

With the SAPR signal changing from not asserted to asserted, the pre-charge transistor 242 changes from a closed or conducting state to an open or non-conducting state to de-couple the data inversion selection node DINV from the VDD node. With the YS1 signal changing from not asserted to asserted (and inversely, the YS1B signal changing from asserted to not asserted), the pull-down transistor 234-1 of the CIT circuit 232-1 may change from an open or non-conducting state to a closed or conducting state, and the pull-up transistor 236-1 of the CIT circuit 232-1 changes from an open or non-conducting state to a closed or conducting state. With the pull-down transistor 234-1 being disabled from pulling down the voltage of the data inversion selection node DINV and the pull-up transistor 236-1 in a closed or conducting state, the voltage of the data inversion selection node DINV is or remains pulled up to the voltage of the VDD node through the pull-up transistor 236-1.

Further, with the YS1 signal changing from not asserted to asserted, the mux transistor 214-1 of the multiplexer 128 changes from an open or non-conducting state to a closed or conducting state and passes the voltage on the bit line BL1 to the input node of the sense amplifier 224. The sense amplifier 224 determines whether the voltage passed from the bit line BL1 is above the sense voltage threshold 502. When the voltage on the bit line BL1 is below the sense voltage threshold 502, for example leading up to time t3, the sense amplifier 224 outputs to the first input node of the multiplexer 228 and the input node of the inverter 226 a logical “0”. The inverter 226 inverts the logical “0” and outputs a logical “1” to the second input node of the multiplexer 228. With the data inversion selection node DINV being a high voltage (e.g., a logical “1”), the multiplexer 228 outputs the logical “0” as the Q signal, which may be sampled at time t3. Thereafter, at time t4, the WL0, SAPR, and YS1 signals are not asserted, in preparation for the next read operation to be performed.

Referring to FIG. 6B, as described above with respect to FIG. 6A, at time to, the WL1, SAPR, and YS1 signals are not asserted (e.g., a low voltage); the data inversion selection node DINV is pulled up to a high voltage (e.g., the voltage of the VDD node); and the bit line BL1 is floating at a low voltage. At time t1, the bit line BL1 begins to be pre-charged to a high voltage, like described above with respect to FIG. 6A.

At time t2, the WL1, SAPR, and YS1 signals are asserted (e.g., a high voltage). With the WL1 signal changing from not asserted to asserted, the pull-down transistor 202-11 may change from an open or non-conducting state to a closed or conducting state. However, since the pull-down transistor 202-11 is disabled from pulling down a voltage of the bit line BL1, the pull-down transistor 202-11 does not discharge the bit line BL1 even if the pull-down transistor 202-11 changes to a closed or conducting state. The bit line BL1 may slightly discharge due to leakage from other pull-down transistors 202-1*x* electrically connected to the bit line BL1.

The SAPR and YS1 signals changing from not asserted to asserted control the voltage on the data inversion selection node DINV as described above with respect to FIG. 6A. Further, with the YS1 signal changing from not asserted to asserted, the mux transistor 214-1 of the multiplexer 128 changes from an open or non-conducting state to a closed or conducting state and passes the voltage on the bit line BL1 to the input node of the sense amplifier 224. The sense amplifier 224 determines whether the voltage passed from the bit line BL1 is above sense voltage threshold 502. When the voltage on the bit line BL1 is above the sense voltage threshold 502, like from time t2 to time t3, the sense amplifier 224 outputs to the first input node of the multiplexer 228 and the input node of the inverter 226 a logical “1”. The inverter 226 inverts the logical “1” and outputs a logical “0” to the second input node of the multiplexer 228. With the data inversion selection node DINV being a high voltage (e.g., a logical “1”), the multiplexer 228 outputs the logical “1” as the Q signal, which may be sampled at time t3. Thereafter, at time t4, the WL1, SAPR, and YS1 signals are not asserted, in preparation for the next read operation to be performed.

Figure 7:
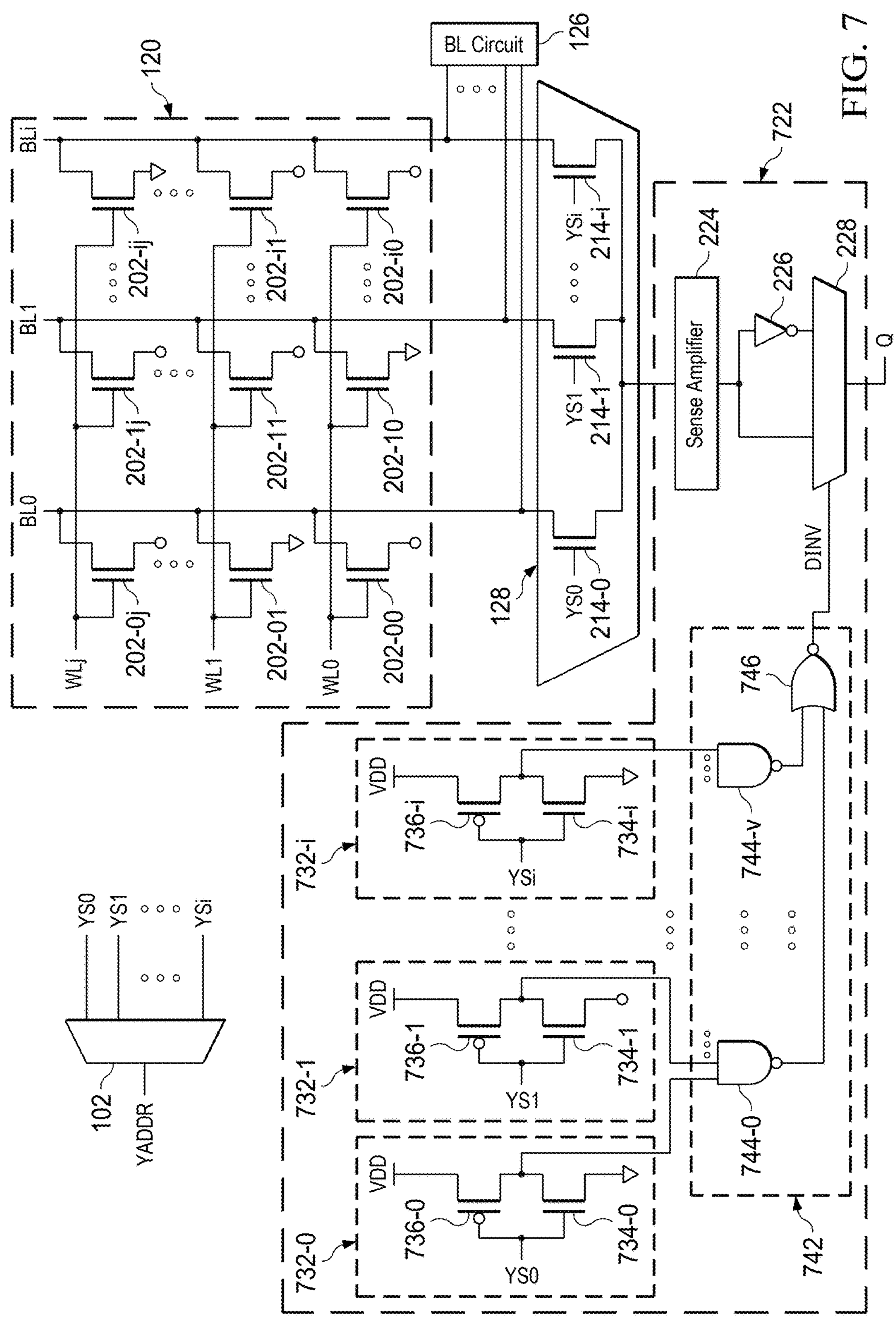
FIG. 7 is another circuit schematic including a memory bank and a logic inversion circuit according to some examples.

FIG. 7 is another circuit schematic including a memory bank 120 and a logic inversion circuit 722 according to some examples. The memory bank 120 in FIG. 7 is as described above with respect to FIG. 2. The logic inversion circuit 722 is an example of the logic inversion circuit 122 of FIG. 1. The logic inversion circuit 222 includes a sense amplifier 224, an inverter 226, and a multiplexer 228, like described above with respect to FIG. 2.

The logic inversion circuit 722 also includes CIT circuits 732-0, 732-1, . . . , 732-*i* (collectively or individually, CIT circuit(s) 732). Each CIT circuit 732 is configured to indicate whether a corresponding column of the memory bank 120 (e.g., memory cells electrically connected to a same bit line) stores non-inverted data or inverted data. For example, the CIT circuit 732-0 is configured to indicate whether memory cells electrically connected to the bit line BL0 stores non-inverted data or inverted data; the CIT circuit 732-1 is configured to indicate whether memory cells electrically connected to the bit line BL1 stores non-inverted data or inverted data; etc. Each CIT circuit 732-*g* includes a pull-down transistor 734-*g* (e.g., an n-type transistor, such as an nFET) and a pull-up transistor 736-*g* (e.g., a p-type transistor, such as a pFET).

Respective drain nodes of the pull-down transistor 734-*g* and the pull-up transistor 736-*g* are electrically connected together and are output nodes of the CIT circuit 732-*g*. The source node of the pull-up transistor 736-*g* is electrically connected to a positive power supply node (e.g., a VDD node). The source node of the pull-down transistor 734-*g* is electrically connected to a grounded power supply node (e.g., a VSS or ground node) or is not electrically connected to the grounded supply node (e.g., is electrically floating). As an example, in the CIT circuit 732-0, the source node of the pull-down transistor 734-0 is electrically connected to a grounded power supply node (e.g., a VSS or ground node). As another example, in the CIT circuit 732-1, the source node of the pull-down transistor 734-1 is electrically floating. The electrical connection of the source node of the pull-down transistor 734-*g* indicates whether the column of the memory bank 120 corresponding to the CIT circuit 732-*g* is programmed with non-inverted data or inverted data.

For each CIT circuit 732-*g*, gate nodes of the pull-down transistor 734-*g* and the pull-up transistor 736-*g* are electrically connected to a respective select node YSg. For example, in the CIT circuit 732-0, the gate nodes of the pull-down transistor 734-0 and the pull-up transistor 736-0 are electrically connected to a select node YS0. As another example, in the CIT circuit 732-1, the gate nodes of the pull-down transistor 734-1 and the pull-up transistor 736-1 are electrically connected to a select node YS1.

The logic inversion circuit 722 further includes a combinational logic circuit 742. In the illustrated example, the combinational logic circuit 742 implements a logical AND function of the output signals of the CIT circuits 732. In some examples, the combinational logic circuit 742 may be an (i+1)-input AND gate. In the illustrated example, the combinational logic circuit 742 includes u-input NAND gates 744-0 through 744-*v* and a (v+1)-input NOR gate 746 (e.g., where u(v+1)=(i+1)). The input nodes of the NAND gates 744-0 through 744-*v* are electrically connected to respective output nodes of the CIT circuits 732. The output nodes of the NAND gates 744-0 through 744-*v* are electrically connected to respective input nodes of the NOR gate 746. The output node of the NOR gate 746 is electrically connected to the data inversion selection node DINV. The data inversion selection node DINV is electrically connected to a selection input node of the multiplexer 228. The illustrated combinational logic circuit 742 implements the following logic, where Og is the output signal of CIT circuit 732-*g*:

$$DINV = \neg \bigvee_{a=0}^{v} \neg \bigwedge_{b=0}^{u-1} O_{au+b} = \bigwedge_{a=0}^{u(v+1)-1} O_a$$

Where, per convention, $\wedge$ is an AND operation, $\vee$ is an OR operation, and $\neg$ is a NOT operation. Other combinational logic may be implemented as the combinational logic circuit 742.

Reading a logical "0" that is a stored inverted datum, a logical "1" that is a stored inverted datum, a logical "0" that is a stored non-inverted datum, and logical "1" that is a stored non-inverted datum in FIG. 7 generally operates like described above with respect to FIGS. 5A, 5B, 6A, and 6B, respectively. The SAPR signal may be omitted when reading a memory cell in FIG. 7.

When no select signal is asserted, the pull-up transistor 736 of each CIT circuit 732 is in a closed or conducting state and the pull-down transistor 734 of each CIT circuit 732 is in an open or non-conducting state such that logical "1"s are output to each input node of the NAND gates 744-0 through 744-*v*. When a YSg signal is asserted, if the source node of the pull-down transistor 734-*g* is electrically connected to the grounded power supply node, the output node of the CIT circuit 732-*g* is pulled down to a logical "0", which results in a logical "0" being on the data inversion selection node DINV. For example, similar to FIGS. 5A and 5B, When the YS0 signal is asserted, the output node of the CIT circuit 732-0 is pulled down to a logical "0" through the pull-down transistor 734-0, which results in a logical "0" being on the data inversion selection node DINV. Like in FIGS. 5A and 5B, this results in the multiplexer 228 outputting to the output node Q the signal output by the inverter 226.

When a YSg signal is asserted, if the source node of the pull-down transistor 734-*g* is not electrically connected to the grounded power supply node (e.g., is electrically floating), the output node of the CIT circuit 732-*g* is not pulled down to a logical "0" and remains a logical "1", which results in a logical "1" being on the data inversion selection node DINV. For example, similar to FIGS. 6A and 6B, When the YS1 signal is asserted, the output node of the CIT circuit 732-1 remains a logical "1", which results in a logical "1" being on the data inversion selection node DINV. Like in FIGS. 6A and 6B, this results in the multiplexer 228 outputting to the output node Q the signal output by the sense amplifier 224.

Some examples may be embodied as an intellectual property (IP) core (e.g., a digital or electronic representation) stored in a non-transitory computer-readable storage medium (e.g., memory). For example, a circuit design including a logic inversion circuit 122, 222, 722 may be embodied as an IP core stored in a non-transitory computer-readable storage medium. In some examples, the circuit design may also include a corresponding memory bank 120. In further examples, the circuit design may include a memory output block 110 that includes multiple memory banks 120 and associated respective logic inversion circuits 122, 222, 722. The IP core may be implemented as a netlist, a circuit schematic, or other representation. The IP core may be configurable to program memory cells and/or to configure CIT circuits. For example, the IP core may not include representations of programming metal vias to program memory cells and/or configure CIT circuits but may permit subsequent selective insertion of representations of programming metal vias to program memory cells and/or configure CIT circuits.

A user may be provided access to the IP core stored in the non-transitory computer-readable storage medium. The user can incorporate the IP core into a user design. For example, a user may download or otherwise obtain the IP core onto a computing system that implements an electronic design automation (EDA) environment, and may incorporate the IP core into another circuit design using the EDA environment. The user may configure CIT circuits of a logic inversion circuit 122, 222, 722 by selectively inserting, using the EDA environment, representations of programming metal vias in a circuit design. Similarly, the user may perform programming of memory cells by selectively inserting, using the EDA environment, representations of programming metal vias in the circuit design. The representation of the programming metal vias may be inserted in a layout, may be inserted by electrically connecting nodes in a schematic, may be inserted by assigning nets in a netlist, or any other mechanism.

Examples of a non-transitory computer-readable storage medium include random access memory (RAM) (e.g., static RAM (SRAM) and dynamic RAM (DRAM)), read only memory (ROM), programmable ROM (PROM), erasable programmable ROM (EPROM), electrically erasable programmable ROM (EEPROM), flash, NAND memory, CD-ROM, an optical storage device, a magnetic storage device, etc. The non-transitory computer-readable storage medium, in some examples, may be standalone memory, and may be included in any computing system (e.g., a desktop computer, a laptop computer, a server, a database, etc.).

Figures 8, 9:
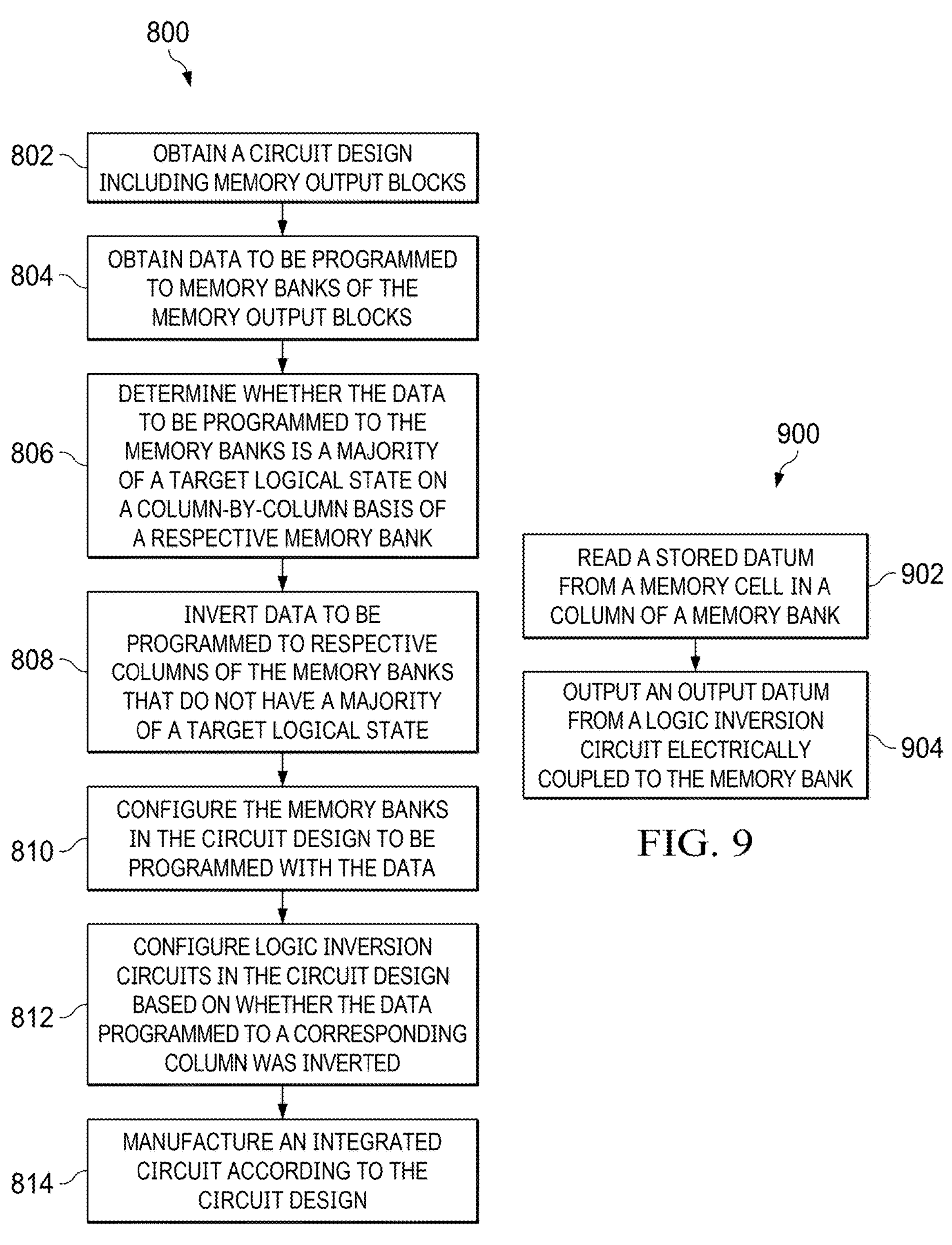
FIG. 8 is a flowchart of a method for designing and manufacturing an integrated circuit according to some examples.
FIG. 9 is a flowchart of a method for performing a read operation on an integrated circuit according to some examples.

FIG. 8 is a flowchart of a method 800 for designing and manufacturing an integrated circuit according to some examples. At 802, a circuit design including memory output blocks is obtained. Obtaining the circuit design may include creating the circuit design by populating the circuit design with one or more instances of one or more IP cores. The memory output blocks may generally be like described above with respect to FIG. 1; however, at 802, the memory banks and logic inversion circuits may not necessarily be configured (e.g., programmed).

At 804, data to be programmed to memory banks of the memory output blocks is obtained. The data may be, for example, instructions for a boot sequence or other data to be stored in ROM. At 806, whether the data to be programmed to the memory banks is a majority of a target logical state (e.g., logical "1") on a column-by-column basis of a respective memory bank is determined. The data to be programmed to a memory bank may be analyzed separately from data to be programmed to any other memory bank. At 808, data to be programmed to respective columns of the memory banks that do not have a majority of a target logical state are inverted. At 810, the memory banks are configured in the circuit design to be programmed with the data, which includes any inverted data and, when not inverted, the non-inverted data. This permits each column of the memory banks to be programmed with the majority target state. The memory banks may be configured in the circuit design by inserting representations of programming metal vias, as described above. At 812, logic inversion circuits (e.g., CIT circuits) are configured in the circuit design based on whether the data programmed to a corresponding column was inverted. Configuring the logic inversion circuits provides an indication whether the data stored in the corresponding column was inverted at 808. The logic inversion circuits may be configured in the circuit design by inserting representations of programming metal vias, as described above. The operations of 802-812 may be performed using an EDA environment executing on a computer system, wherein the EDA environment is embodied by instructions stored on a non-transitory computer readable medium and executed by one or more processors of the computer system.

Thereafter, at 814, an integrated circuit is manufactured according to the circuit design. The circuit design may be transformed into one or more lithography masks and recipes for semiconductor processing. Implementing the lithography masks and recipes in semiconductor processing may result in the manufactured integrated circuit.

FIG. 9 is a flowchart of a method 900 for performing a read operation on an integrated circuit according to some examples. At 902, a stored datum is read from a memory cell in a column of a memory bank. The memory bank may be included in a memory output block that includes multiple memory banks, as in FIG. 1. An address may be received by a decoder, and the decoder may assert, based on the address, signals that cause a bit line circuit to pre-charge the bit line at the memory cell to be read and that drive a word line at the memory cell to be asserted. This may result in the bit line at the memory cell to remain at a high voltage or to be discharged to a low voltage, as described previously. The voltage of the bit line is passed through a multiplexer (based on a control signal from the decoder) to a sense amplifier of an associated logic inversion circuit.

At 904, an output datum is output from the associated logic inversion circuit electrically coupled to the memory bank. The sense amplifier outputs a logical state based on the voltage of the bit line passed to the sense amplifier, which logical state is the state of the stored datum. The logical state is output to a multiplexer and to an inverter, which outputs an inverted logical state to the multiplexer. The decoder may further assert, based on the address, signals that cause a CIT circuit associated with the column from which the stored datum was read to pull up or down a voltage. Whether the voltage is pulled up to a high voltage or pulled down to a low voltage determines whether the multiplexer outputs the logical state input from the sense amplifier or the inverted logical state input from the inverter. Hence, the multiplexer selectively outputs a non-inverted version of the stored datum (e.g., input from the sense amplifier) or an inverted version of the stored datum (e.g., input from the inverter) based on a configuration of the CIT circuit associated with the column from which the stored datum was read.

An example is a circuit including a memory output block having a single bit width output node. The memory output block includes a memory bank and a logic inversion circuit. The memory bank is configured to output a read datum. The logic inversion circuit is associated with the memory bank. An input node of the logic inversion circuit is electrically coupled to the memory bank to receive the read datum. The logic inversion circuit is configured to output an output datum on an output node of the logic inversion circuit. The logic inversion circuit is configured to obtain the output datum by selecting either one of an inverted version of the read datum or a non-inverted version of the read datum received from the memory bank based on a column of the memory bank from which the read datum is read.

Another example is a method. A read datum is read from a memory cell in a column of a memory bank. An output datum is output from a logic inversion circuit electrically coupled to the memory bank. The logic inversion circuit obtains the output datum including selecting an inverted version of the read datum or a non-inverted version of the read datum based on the column of the memory bank.

A further example is a non-transitory computer-readable storage medium storing an electronic representation of a circuit design. The circuit design includes a logic inversion circuit. The logic inversion circuit is configured to receive on an input node a read datum from a memory bank. The logic inversion circuit includes column inversion tag circuits. Each column inversion tag circuit of the column inversion tag circuits corresponds to a respective column of the memory bank and is configurable to indicate whether to select an inverted version of the read datum or a non-inverted version of the read datum. The logic inversion circuit is configured to obtain an output datum for outputting on an output node of the logic inversion circuit by selecting the inverted version of the read datum or the non-inverted version of the read datum based on a configuration of the respective column inversion tag circuit corresponding to the respective column of the memory bank from which the read datum is read.

Figure 10:
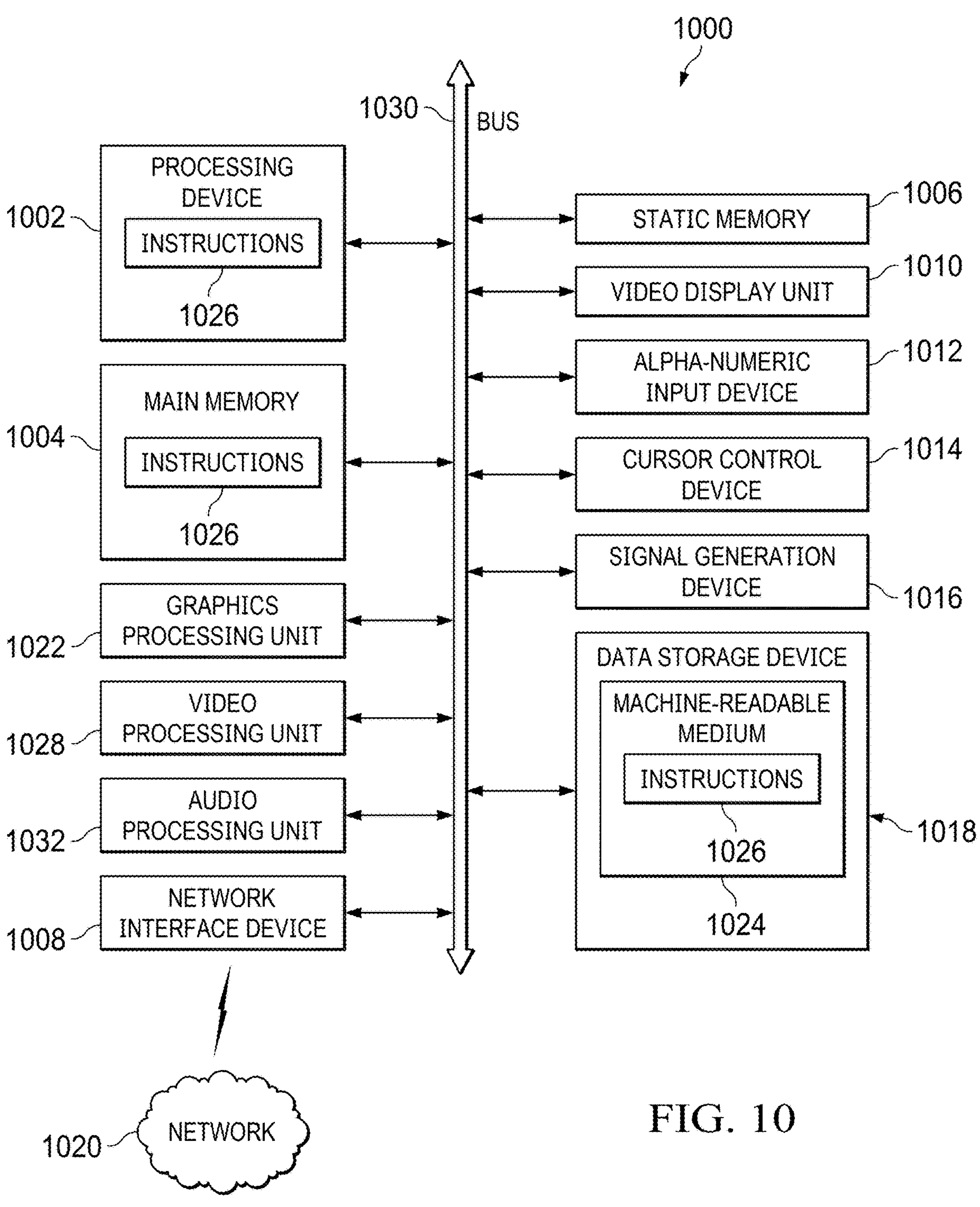
FIG. 10 depicts a diagram of an example computer system in which examples of the present disclosure may operate.

FIG. 10 illustrates an example machine of a computer system 1000 within which a set of instructions, for causing the machine to perform any one or more of the methodologies discussed herein, may be executed. For example, the computer system 1000 may execute an EDA environment for creating a circuit design. In alternative implementations, the machine may be connected (e.g., networked) to other machines in a local area network (LAN), an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable storage medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a non-transitory computer-readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable storage medium having stored thereon instructions, which may be used to program a computer system (or other electronic devices) to perform a process according to the present disclosure. A machine-readable storage medium includes any mechanism for storing information in a form readable by a machine (e.g., a computer). For example, a machine-readable (e.g., a computer-readable) storage medium includes a machine-readable (e.g., a computer-readable) storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A circuit comprising:

a memory output block having a single bit width output node, the memory output block comprising:

a first memory bank having a first plurality of columns, wherein a first column of the first plurality of columns has a first plurality of memory cells, each memory cell of the first plurality of memory cells being configured to store a respective first stored datum; and a first logic inversion circuit associated with the first memory bank, an input node of the first logic inversion circuit being electrically coupled to the first memory bank to receive the respective first stored datum, wherein the first logic inversion circuit is configured to output a respective first output datum by selecting either one of an inverted version of the respective first stored datum or a non-inverted version of the respective first stored datum for all of the first plurality of memory cells based on the first column of the first memory bank.

2. The circuit of claim 1, wherein the memory output block further includes:

a second memory bank having a second plurality of columns, wherein a second column of the second plurality of columns has a second plurality of memory cells, each memory cell of the second plurality of memory cells being configured to store a respective second stored datum; and a second logic inversion circuit associated with the second memory bank, an input node of the second logic inversion circuit being electrically coupled to the second memory bank to receive the respective second stored datum, the second logic inversion circuit being configured to output a respective second output datum by selecting either an inverted version of the respective second stored datum or a non-inverted version of the respective second stored datum for all of the second plurality of memory cells based on the second column of the second memory bank.

3. The circuit of claim 1, wherein the memory output block further includes:

a plurality of memory banks, the plurality of memory banks including the first memory bank, each memory bank of the plurality of memory banks having a respective plurality of columns, wherein each column of the respective plurality of columns has a plurality of memory cells, each memory cell of the plurality of memory cells of each column of the respective plurality of columns being configured to store a respective stored datum; and a plurality of logic inversion circuits, the plurality of logic inversion circuits including the first logic inversion circuit, each logic inversion circuit of the plurality of logic inversion circuits being associated with a respective one memory bank of the plurality of memory banks, an input node of the respective logic inversion circuit being electrically coupled to the respective one memory bank to receive the respective stored datum, each logic inversion circuit of the plurality of logic inversion circuits being configured to output a respective output datum by selecting either an inverted version of the respective stored datum or a non-inverted version of the respective stored datum for all of the plurality of memory cells in a column of the respective plurality of columns based on the column of the respective plurality of columns.

4. The circuit of claim 3, wherein the memory output block further includes a buffer circuit, the logic inversion circuits being electrically connected to and configured to output the respective output datum to an input node of the buffer circuit, an output node of the buffer circuit being the single bit width output node of the memory output block.

5. The circuit of claim 1, wherein the first logic inversion circuit includes column inversion tag circuits, each column inversion tag circuit of the column inversion tag circuits being associated with a respective column of the first plurality of columns, a configuration of the respective column inversion tag circuit determining whether the first logic inversion circuit selects the inverted version of a respective stored datum or the non-inverted version of the respective stored datum for all of a plurality of memory cells in the respective column of the first plurality of columns based on the respective column of the first plurality of columns.

6. The circuit of claim 1, wherein the first logic inversion circuit includes:

a sense amplifier having an input node electrically coupled to the first memory bank;

an inverter having an input node electrically connected to an output node of the sense amplifier;

a multiplexer having a first input node electrically connected to the output node of the sense amplifier and having a second input node electrically connected to an output node of the inverter; and column inversion tag circuits, each column inversion tag circuit of the column inversion tag circuits being associated with a respective column of the first plurality of columns, each column inversion tag circuit of the column inversion tag circuits including:

a pull-down transistor having a drain node electrically connected to a data inversion control node of the respective column inversion tag circuit, the data inversion control node being electrically connected to a selection input node of the multiplexer; and a pull-up transistor having a drain node electrically connected to the data inversion control node of the respective column inversion tag circuit, wherein either the pull-down transistor is disabled from pulling down a voltage of the data inversion control node or the pull-up transistor is disabled from pulling up the voltage of the data inversion control node, wherein whether the pull-down transistor is disabled or the pull-up transistor is disabled determines whether the first logic inversion circuit selects the inverted version of a respective stored datum or the non-inverted version of the respective stored datum for all of a plurality of memory cells in the respective column of the first plurality of columns with which the respective column inversion tag is associated.

7. The circuit of claim 1, wherein the first logic inversion circuit includes:

a sense amplifier having an input node electrically coupled to the first memory bank;

an inverter having an input node electrically connected to an output node of the sense amplifier;

a multiplexer having a first input node electrically connected to the output node of the sense amplifier and having a second input node electrically connected to an output node of the inverter;

column inversion tag circuits, each column inversion tag circuit of the column inversion tag circuits being associated with a respective column of the first plurality of columns, each column inversion tag circuit of the column inversion tag circuits including:

a pull-down transistor having a drain node electrically connected to an output node of the respective column inversion tag circuit, wherein whether a source node of the pull-down transistor is electrically floating or is electrically connected to a grounded power supply node determines whether the first logic inversion circuit selects the inverted version of a respective stored datum or the non-inverted version of the respective stored datum for all of a plurality of memory cells in the respective column of the first plurality of columns with which the respective column inversion tag is associated; and a pull-up transistor having a drain node electrically connected to the output node of the respective column inversion tag circuit and having a source node electrically connected to a positive power supply node; and a combinational logic circuit having input nodes electrically connected to the respective output nodes of the column inversion tag circuits, an output node of the combinational logic circuit being electrically connected to a selection input node of the multiplexer.

8. A method comprising:

reading a stored datum from a memory cell in a column of a memory bank, the memory bank having a plurality of columns including the column, wherein the column has a plurality of memory cells including the memory cell, each memory cell of the plurality of memory cells being configured to store a respective stored datum; and outputting an output datum from a logic inversion circuit electrically coupled to the memory bank comprising selecting either one of an inverted version of the respective stored datum or a non-inverted version of the respective stored datum for all of the plurality of memory cells based on the column of the memory bank.

9. The method of claim 8, wherein the memory bank is included in a memory block having a single bit width output node, the memory block including a plurality of memory banks, the plurality of memory banks including the memory bank.

10. The method of claim 9, further comprising outputting the output datum from a buffer circuit, the memory block including a plurality of logic inversion circuits, the plurality of logic inversion circuits including the logic inversion circuit, each logic inversion circuit of the plurality of logic inversion circuits being associated with a respective memory bank of the plurality of memory banks, the buffer circuit having an input node electrically connected to output nodes of the plurality of logic inversion circuits, the output datum being output on the output node of the logic inversion circuit.

11. The method of claim 8, wherein the logic inversion circuit includes column inversion tag circuits corresponding to respective columns of the plurality of columns, a column inversion tag circuit of the column inversion tag circuits corresponding the column of the plurality of columns from which the stored datum is read indicating whether to select the inverted version of the stored datum to obtain the output datum, the logic inversion circuit selecting the inverted version of the stored datum to obtain the output datum when the column inversion tag circuit indicates that the inverted version of the stored datum is to be selected, the logic inversion circuit selecting the non-inverted version of the stored datum to obtain the output datum when the column inversion tag circuit indicates that the non-inverted version of the stored datum is to be selected.

12. The method of claim 8, wherein the logic inversion circuit includes:

a sense amplifier having an input node receiving the stored datum from the memory bank;

an inverter having an input node electrically connected to an output node of the sense amplifier;

a multiplexer having a first input node electrically connected to the output node of the sense amplifier and having a second input node electrically connected to an output node of the inverter, the non-inverted version of the stored datum being on the first input node of the multiplexer, the inverted version of the stored datum being on the second input node of the multiplexer; and column inversion tag circuits corresponding to respective columns of the plurality of columns, the column inversion tag circuits controlling a voltage on a selection input node of the multiplexer to select the inverted version of the stored datum or the non-inverted version of the stored datum to obtain the output datum.

13. The method of claim 12, wherein each column inversion tag circuit of the column inversion tag circuits includes:

a pull-down transistor having a drain node electrically connected to a data inversion control node of the respective column inversion tag circuit, the data inversion control node being electrically connected to the selection input node of the multiplexer; and a pull-up transistor having a drain node electrically connected to the data inversion control node of the respective column inversion tag circuit, wherein either the pull-down transistor is disabled from pulling down a voltage of the data inversion control node or the pull-up transistor is disabled from pulling up the voltage of the data inversion control node, wherein whether the pull-down transistor is disabled or the pull-up transistor is disabled determines whether the logic inversion circuit selects the inverted version of the stored datum or the non-inverted version of the stored datum when the stored datum is read from the column of the plurality of columns corresponding to the respective column inversion tag circuit.

14. The method of claim 12, wherein:

each column inversion tag circuit of the column inversion tag circuits includes:

a pull-down transistor having a drain node electrically connected to an output node of the respective column inversion tag circuit, wherein whether a source node of the pull-down transistor is electrically floating or is electrically connected to a grounded power supply node determines whether the logic inversion circuit selects the inverted version of the stored datum or the non-inverted version of the stored datum when the stored datum is read from the column of the plurality of columns corresponding to the respective column inversion tag circuit; and a pull-up transistor having a drain node electrically connected to the output node of the respective column inversion tag circuit and having a source node electrically connected to a positive power supply node; and the logic inversion circuit includes a combinational logic circuit having input nodes electrically connected to respective output nodes of the column inversion tag circuits, an output node of the combinational logic circuit being electrically connected to the selection input node of the multiplexer.

15. A non-transitory computer-readable storage medium storing an electronic representation of a circuit design, the circuit design comprising:

a logic inversion circuit configured to receive on an input node a read datum from a memory bank, the logic inversion circuit comprising column inversion tag circuits, each column inversion tag circuit of the column inversion tag circuits corresponding to a respective column of the memory bank and being configurable to indicate whether to select an inverted version of the read datum or a non-inverted version of the read datum, the logic inversion circuit being configured to obtain an output datum for outputting on an output node of the logic inversion circuit by selecting the inverted version of the read datum or the non-inverted version of the read datum based on a configuration of the respective column inversion tag circuit corresponding to the respective column of the memory bank from which the read datum is read.

16. The non-transitory computer-readable storage medium of claim 15, wherein each column inversion tag circuit of the column inversion tag circuits includes:

a pull-down transistor; and a pull-up transistor, a drain node of the pull-down transistor being electrically connected to a drain node of the pull-up transistor, wherein the respective column inversion tag circuit is configurable to indicate whether to select the inverted version of the read datum or the non-inverted version of the read datum by selectively electrically connecting either of a source node of the pull-down transistor to a grounded power supply node or a source node of the pull-up transistor to a positive power supply node.

17. The non-transitory computer-readable storage medium of claim 15, wherein each column inversion tag circuit of the column inversion tag circuits includes:

a pull-down transistor, wherein the respective column inversion tag circuit is configurable to indicate whether to select the inverted version of the read datum or the non-inverted version of the read datum by selectively electrically connecting a source node of the pull-down transistor to a grounded power supply node; and a pull-up transistor, a drain node of the pull-down transistor being electrically connected to a drain node of the pull-up transistor, a source node of the pull-up transistor being electrically connected to a positive power supply node.

18. The non-transitory computer-readable storage medium of claim 15, wherein each column inversion tag circuit of the column inversion tag circuits is configurable to indicate whether to select the inverted version of the read datum or the non-inverted version of the read datum by selectively inserting one or more metal vias in a layout of the respective column inversion tag circuit.

19. The non-transitory computer-readable storage medium of claim 15, wherein the circuit design further comprises:

a sense amplifier having an input node that is electrically connected to the input node of the logic inversion circuit;

an inverter having an input node electrically connected to an output node of the sense amplifier; and a multiplexer having a first input node electrically connected to the output node of the sense amplifier and having a second input node electrically connected to an output node of the inverter, the column inversion tag circuits being configured to control a signal on a selection input node of the multiplexer.

20. The non-transitory computer-readable storage medium of claim 15, wherein the circuit design further comprises the memory bank the memory bank being electrically coupled to the input node of the logic inversion circuit, the memory bank comprising memory cells arranged in columns, the memory cells being configurable to store respective data.

* * * * *